US011961355B2

(12) United States Patent
Lyons et al.

(10) Patent No.: US 11,961,355 B2
(45) Date of Patent: Apr. 16, 2024

(54) CONTROLLING A NETWORK CARD GAME

(71) Applicant: LNW Gaming, Inc., Las Vegas, NV (US)

(72) Inventors: Martin S. Lyons, Henderson, NV (US); Ryan Yee, Las Vegas, NV (US); Michael Vizzo, Las Vegas, NV (US); Colin Helsen, Arundel (AU)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 17/752,087

(22) Filed: May 24, 2022

(65) Prior Publication Data

US 2022/0383692 A1 Dec. 1, 2022

Related U.S. Application Data

(60) Provisional application No. 63/192,647, filed on May 25, 2021.

(51) Int. Cl.
*G07F 17/32* (2006.01)

(52) U.S. Cl.
CPC ...... *G07F 17/3206* (2013.01); *G07F 17/3223* (2013.01); *G07F 17/3258* (2013.01); *G07F 17/3293* (2013.01)

(58) Field of Classification Search
None
See application file for complete search history.

(56) References Cited

U.S. PATENT DOCUMENTS

| | | | |
|---|---|---|---|
| 5,722,893 | A | 3/1998 | Hill et al. |
| 6,886,829 | B2 | 5/2005 | Hessing et al. |
| 7,950,663 | B2 | 5/2011 | Schubert et al. |
| 8,100,753 | B2 | 1/2012 | Soltys |
| 8,702,101 | B2 | 4/2014 | Krenn et al. |
| 9,316,597 | B2 | 4/2016 | Blazevic |
| 9,474,957 | B2 | 10/2016 | Haushalter et al. |
| 9,776,072 | B2 | 10/2017 | Riordan et al. |
| 10,086,260 | B2 | 10/2018 | Grauzer et al. |
| 10,286,291 | B2 | 5/2019 | Wadds et al. |
| 10,343,054 | B2 | 7/2019 | Czyzewski et al. |
| 10,525,328 | B2 | 1/2020 | Riordan et al. |

(Continued)

FOREIGN PATENT DOCUMENTS

| | | | |
|---|---|---|---|
| WO | 03026763 | A1 | 4/2003 |
| WO | 2015021272 | A1 | 2/2015 |
| WO | 2015051312 | A1 | 4/2015 |

*Primary Examiner* — Ronald Laneau

(57) ABSTRACT

According to one aspect of the present disclosure, a system is provided for controlling a network game. In some instances, a processor of the system selects a winning card value of an undealt playing card for the network game. The network game spans a plurality of gaming tables having a deck of cards used for individual card games separate from the network game. A shuffler at each table shuffles the deck of cards for the individual card games. The system further detects, in response to analyzing image data at each of the gaming tables by a machine learning model, that a playing card, having the winning card value, is dealt. The system further determines, by a machine learning model, a participant to whom the playing card was dealt. The system further electronically validates a win for the network game with an electronic account for the participant.

19 Claims, 11 Drawing Sheets

(56) References Cited

U.S. PATENT DOCUMENTS

| | | | | |
|---|---|---|---|---|
| 11,113,932 | B2 * | 9/2021 | Chun | G07F 17/3267 |
| 2007/0238502 | A1 | 10/2007 | Pokorny et al. | |
| 2008/0051169 | A1 | 2/2008 | Michaelson et al. | |
| 2015/0021272 | A1 | 1/2015 | Ko et al. | |
| 2016/0203672 | A1 | 7/2016 | Acres | |
| 2016/0354678 | A1 | 12/2016 | Grauzer et al. | |
| 2019/0060738 | A1 * | 2/2019 | Riordan | A63F 1/12 |
| 2020/0098223 | A1 | 3/2020 | Lyons et al. | |
| 2020/0402342 | A1 | 12/2020 | Kelly et al. | |
| 2022/0383698 | A1 * | 12/2022 | Lyons | G07F 17/3239 |

* cited by examiner

CONTROLLING A NETWORK CARD GAME

CROSS-REFERENCE TO RELATED APPLICATION

This application claims the priority benefit of U.S. Provisional Patent Application No. 63/192,647 filed May 25, 2021, which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, LNW Gaming, Inc.

FIELD OF THE INVENTION

This disclosure relates generally to networked gaming systems and, more specifically, to networked gaming devices that are locatable within a gaming environment based on communication signals.

BACKGROUND

Gaming devices used in the gaming industry, such as electronic gaming machines (EGMs), card-handling devices, and the like, are used for increasing the efficiency, security and game speed in games such as blackjack, baccarat, poker, and reel-based games, The gaming devices are deployed in a gaming environment (e.g., a casino). At least some gaming devices generate and/or collect data associated with gameplay, device diagnostics, and/or the like. The gaming devices may be communicatively coupled to a network to store and analyze the data from the gaming devices using a centralized data processing system. However, in at least some known networked gaming devices systems, the data collected may be hindered due to processing, memory, and/or networking limitations present in at least some gaming environments. For example, wireless networking in a gaming environment may be limited as a result of congestion in populated wireless bands (e.g., 2.4 GHz).

Moreover, these gaming devices may be moveable to facilitate selective deployment within one or more gaming environments. That is, the gaming devices can be deployed at various locations to fit the configuration of the gaming environments and/or can be removed from the gaming environments for maintenance and storage. As a result, tracking the location of the gaming devices may be desirable to effectively monitor maintenance schedules, usage of the gaming devices (e.g., for billing purposes), and/or gaming environment configurations. However, the processing, memory, and/or networking limitations of the gaming environments may hinder or otherwise prevent accurate and updated location tracking without manual intervention.

SUMMARY

According to one aspect of the present disclosure, a system is provided for controlling a network game. In some instances, a processor of the system selects a winning card value of an undealt playing card for the network game. The network game spans a plurality of gaming tables having a deck of cards used for individual card games separate from the network game. A shuffler at each table shuffles the deck of cards for the individual card games. The system further detects, in response to analyzing image data at each of the gaming tables by a machine learning model, that a playing card, having the winning card value, is dealt. The system further determines, by a machine learning model, a participant to whom the playing card was dealt. The system further electronically validates a win for the network game with an electronic account for the participant.

In some instances, a gaming system includes image-sensing devices; and an electronic game controller configured to control a network card game. The plurality of image-sensing devices are communicatively coupled to the electronic game controller via a network. The electronic game controller is configured to perform operations that cause the system to select a winning card value for the network card game. The electronic game controller is further configured to cause the system to obtain, via at least some of the plurality of image-sensing devices, images of cards being dealt from decks of playing cards for a plurality of card games played at a plurality of gaming tables. The electronic game controller is further configured to cause the system to detect, via analysis of the images using a neural-network model, a card value of each card that is dealt at each of the plurality of gaming tables. The electronic game controller is further configured to cause the system to determine, via comparison of each card value to the winning card value, that the playing card having the winning card value is dealt from one of the decks at one of the gaming tables. Further, the electronic game controller is further configured to cause the system to electronically validate a win for the network card game in response to determination that the playing card was dealt.

In some instances, a gaming system includes a plurality of shuffler devices, and an electronic game controller for a progressive jackpot game. The plurality of shuffler devices are communicatively coupled to the game controller via a telecommunications network. The electronic game controller is further configured to perform operations that cause the system to detect a payout proximity trigger for the progressive jackpot game. The progressive jackpot game is configured to pay out when a contribution pool reaches a payout threshold value. The electronic game controller is further configured to cause the system to analyze, in response to detection of the payout proximity trigger, shuffle-state image data of each of the plurality of shuffler devices. The electronic game controller is further configured to cause the system to determine, in response to analysis of the shuffle-state image data, a card order of an undealt portion for each deck of cards shuffled by the plurality of shuffler devices. The electronic game controller is further configured to cause the system to determine, based on the card order and based on card distribution rules, that a mystery card will be dealt from one deck of cards shuffled by one of the plurality of shuffler devices for a subsequent game play round during which the payout threshold value is reached.

Additional aspects of the invention will be apparent to those of ordinary skill in the art in view of the detailed description of various embodiments, which is made with reference to the drawings, a brief description of which is provided below.

Figure 1:
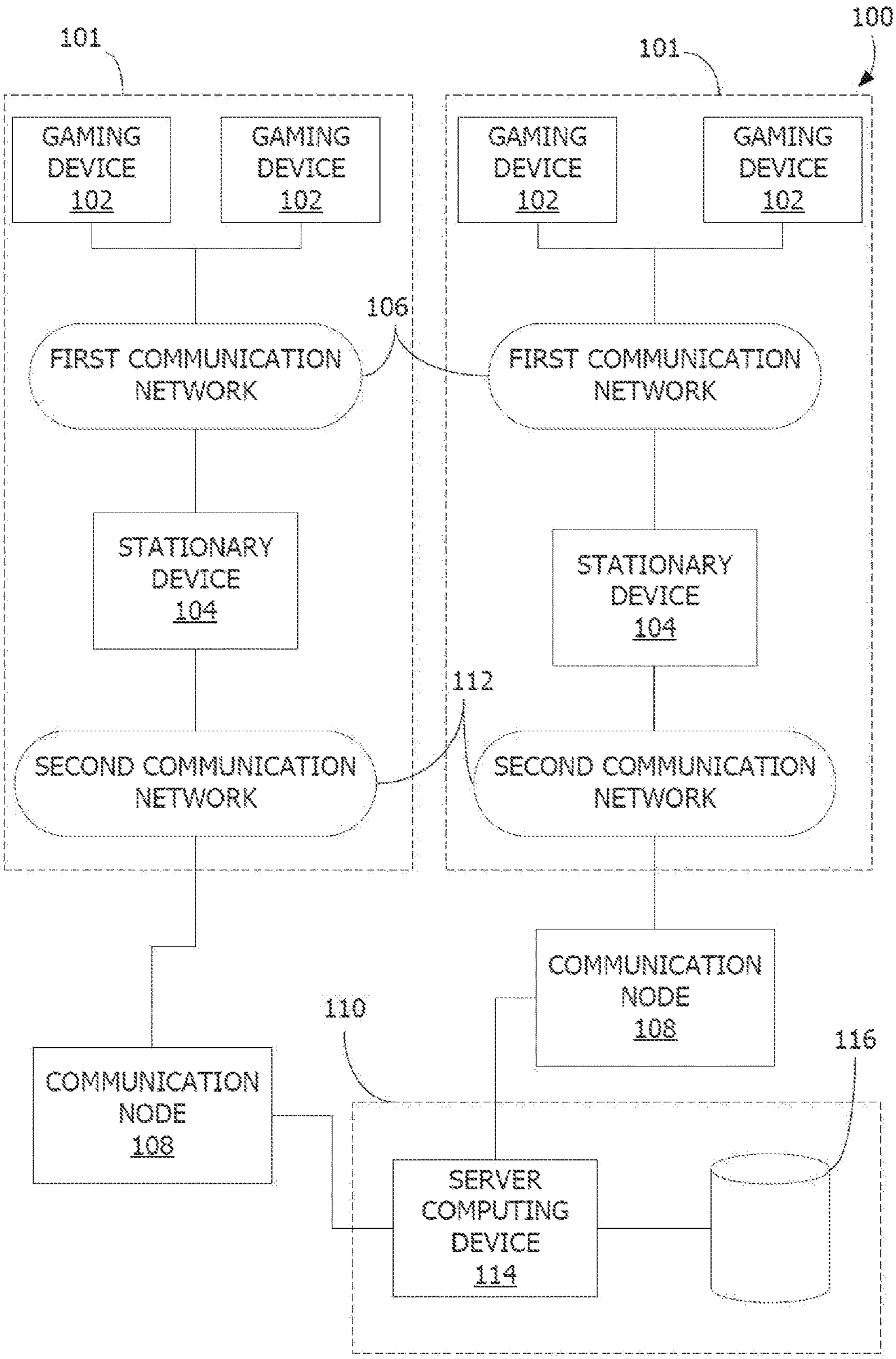
FIG. 1 is a block diagram of an example networked gaming device system according to at least one embodiment.

The figures depict various embodiments for purposes of illustration only. One skilled in the art who also has the benefit of this disclosure may recognize from the following discussion that alternative embodiments of the structures and methods illustrated herein may be employed without departing from the principles described herein.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

In the following description, circuits and functions may be shown in block diagram form in order not to obscure the descriptions in unnecessary detail. Conversely, specific circuit implementations shown and described are examples only and should not be construed as the only way to implement networked gaming devices unless specified otherwise herein. Additionally, block definitions and partitioning of logic between various blocks illustrates one possible embodiment. It may become apparent to one of skill in the art, who also has the benefit of this disclosure, that the embodiments disclosed may be practiced by various other partitioning solutions, all of which are contemplated herein.

Further, the term "module" is used herein in a non-limiting sense to indicate functionality of particular circuits and/or assemblies within embodiments of networked gaming device systems and is not be construed as requiring a particular physical structure, or particular partitioning between elements for performing the indicated functions.

When executed as firmware or software, the instructions for performing the methods and processes described herein may be stored on a computer readable medium. A computer readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

The processors described herein process data signals and may comprise various computing architectures such as a complex instruction set computer (CISC) architecture, a reduced instruction set computer (RISC) architecture, or an architecture implementing a combination of instruction sets. Although only a single processor may be shown, multiple processors may be included. The processors comprise an arithmetic logic unit, a microprocessor, a general purpose computer, or some other information appliance equipped to transmit, receive and process electronic data signals from an associated memory and/or one or more input/output devices The memory described herein stores instructions and/or data that may be executed and/or accessed by the associated processor. The instructions and/or data may comprise code for performing any and/or all of the techniques described herein. The memory may be a dynamic random access memory (DRAM) device, a static random access memory (SRAM) device, Flash RAM (non-volatile storage), combinations of the above, or some other memory device known in the art. While the memory may be shown within some devices, some of the memory can be remote, e.g., on a separate device connected to the device or via a WAN, e.g., a cloud-based storage device.

As used herein, a "gaming device" or "game device" refers to an apparatus associated with one or more aspects of a gaming environment. For example, a gaming device may include card-handling devices, shufflers, electronic gaming machines (EGMs), and/or other devices the provide gameplay features for a game. Gaming devices may also include devices that are not directly involved in gameplay, such as information kiosks, displays, currency conversion devices, and the like. The foregoing examples of gaming devices are for exemplary purposes only and do not limit the gaming devices to the examples mentioned above.

As used herein, a "gaming environment" or "casino environment" is a location or multiple locations in which one or more games (particularly, wagering games) are conducted. Although some gaming environments may not include any gaming devices, in the embodiments described herein, at least one gaming device is deployed at the gaming environment to facilitate play of the one or more games.

The systems and methods described herein facilitate data communication with, and location tracking of, networked gaming devices. These gaming devices may be moveable within and outside of one or more gaming environments to enable operators of the gaming environments to customize the gaming environments and remove the gaming devices from the gaming environments for maintenance. In the systems and methods described herein, each gaming device includes a device transceiver for data communication over a first communication network. The gaming environment includes one or more stationary devices, such as stationary gaming tables, that have transceivers that communicatively couple to the device transceivers of the gaming devices to exchange gaming data via the first communication network. The transceivers are further communicatively coupled to a server via a second communication network to enable the server to collect the gaming data from the gaming devices and the stationary devices for analysis and historical storage.

In the systems and methods described herein, the stationary devices have a known or predetermined location within the gaming environment. The device transceivers, the transceivers of the stationary devices, and/or other computing modules associated with the gaming devices or stationary devices monitor data signals transmitted between each gaming device and each stationary device to calculate a relative distance measurement between the gaming device and the stationary device. The distance data associated with a gaming device is collected and analyzed by the gaming device to determine its location relative to the stationary devices. The location data generated by the gaming devices may be collected by the server to facilitate centralized storage and analysis of the location data. Based on the location data, the server may automatically determine which gaming devices are active, what game that the gaming devices are being used for, which gaming environment the gaming devices are located in, and/or other data relevant to the device location.

The technical problems addressed by the systems and methods described herein may include, for example: (i) data network congestion from transmitting gaming data over populated network channels; (ii) imprecise location determinations of gaming devices and users within gaming environments; (iii) manual configuration of game devices for a particular game; (iv) imprecise usage data collection for gaming devices; and (v) reactive maintenance of gaming device malfunctions.

The technical solutions that may be provided by the systems and methods described herein may include, for example: (i) reduced data network congestion by using network channels other than the populated network channels and frequency bands; (ii) improved precision of locating gaming devices and users within gaming environments; (iii) automated configuration of game devices for a particular game; (iv) improved usage data collection for gaming devices; (v) proactive maintenance of gaming devices to reduce the frequency of device malfunctions; and (vi) reduced cost and complexity of transceivers by consolidating data communication and location services using the same communication network.

FIG. 1 is a block diagram of an example networked gaming device system 100 for use within one or more gaming environments 101. The system 100 includes one or more gaming devices 102, a plurality of stationary devices 104, a first network 106, one or more communication nodes 108, a server system 110, and a second communication network 112. In other embodiments, the system 100 may include additional, fewer, or alternative subsystems, including those described elsewhere herein.

The gaming devices 102 are moveable devices configured to facilitate play of games within the gaming environments 101. In the example embodiment, the gaming devices 102 are deployed in two gaming environments, e.g., two casinos. In other embodiments, the gaming devices 102 may be deployed to a different number of gaming environments (including one).

Figure 2:
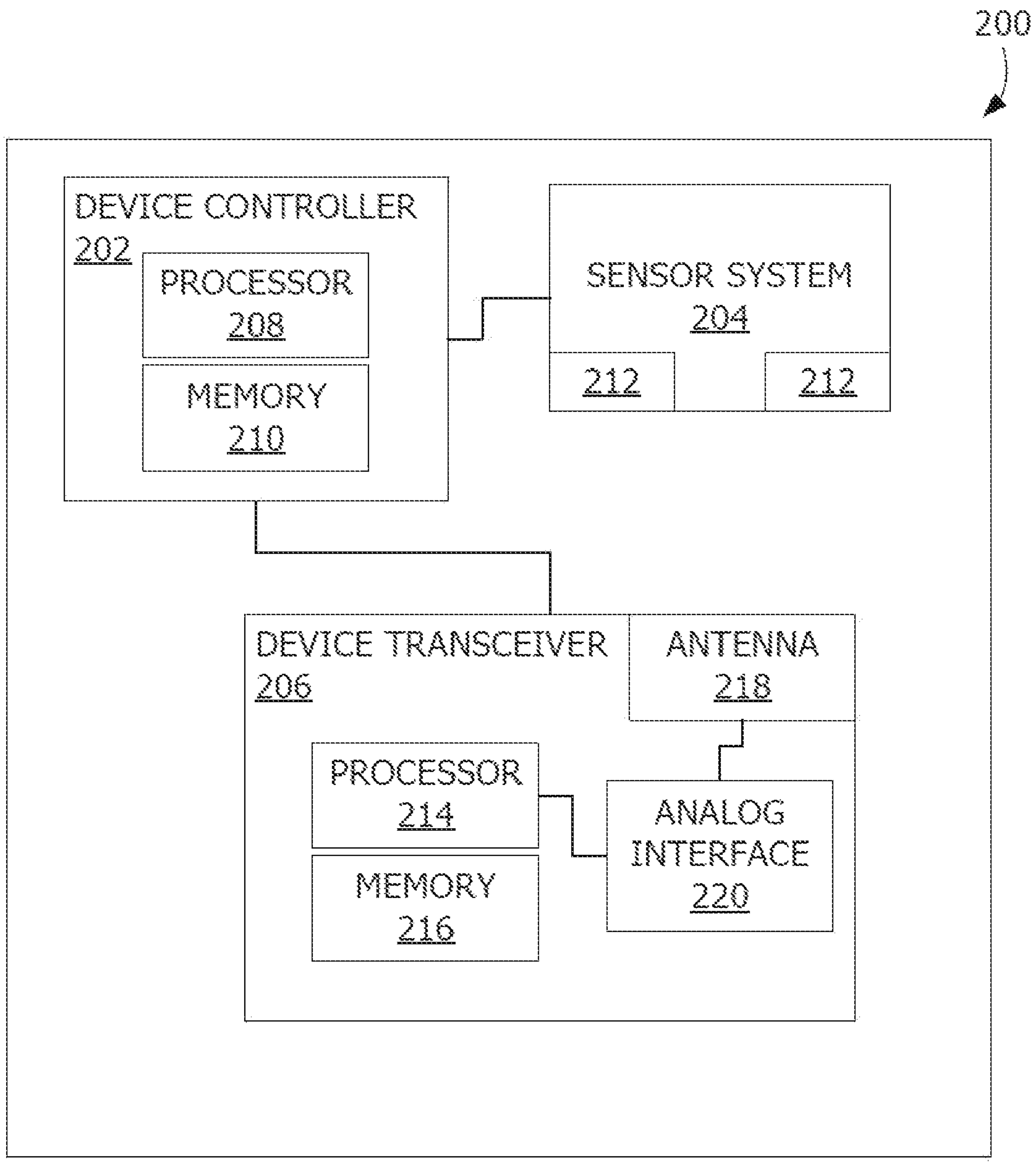
FIG. 2 is a block diagram of an example gaming device according to at least one embodiment.

FIG. 2 is a block diagram of an example gaming device 200 that may be used with a networked gaming device system, such as the system 100. The gaming device 200 includes a device controller 202, a sensor system 204, and a device transceiver 206. In other embodiments, the gaming device 200 may include additional, fewer, or alternative components, including those described elsewhere herein.

The device controller 202 is configured to monitor and/or control operation of the gaming device 200. The device controller 202 includes one or more processors 208 and associated memory 210. The memory 210 stores computer-readable instructions that, when executed by the processors 208, cause the device controller 202 to function as described herein. For example, when the gaming device 200 is a card-handling device, the device controller 202 may be configured to cause the gaming device 200 to receive cards from a dealer, shuffle the cards, and output the shuffled cards to the dealer for use in a card-based game (e.g., poker or blackjack).

The sensor system 204 includes one or more sensors 212 that are configured to collect sensor data associated with the gaming device 200. For example, the sensor system 204 of a card-handling device may include one or more image sensors to capture images of each card passing through a portion of the card-handling device. In another example, the sensor system 204 may include one or more sensors to identify user input and/or credit inputs (e.g., bills, coins, tickets, etc.) from a player. The sensors 212 may be configured to collect any suitable sensor data associated with the gaming device 200 and/or the environment surrounding the gaming device 200, such as motion data, image data, strain data, pressure data, temperature data, usage data, maintenance-related data, and the like. In the example embodiment, the sensor system 204 is communicatively coupled to the device controller 202 to transmit the sensor data. In certain embodiments, the sensor system 204 is communicatively coupled to the device transceiver 206 to transmit the sensor data. Alternatively, the gaming device 200 may not include the sensor system 204.

The device transceiver 206 is communicatively coupled to the device controller 202 and the first communication network 106 (shown in FIG. 1). Although the device transceiver 206 is shown within the gaming device 200, in some embodiments, the device transceiver 206 may be positioned externally from the device 200, such as an add-on or after-market device. In such embodiments, the device transceiver 206 may be communicatively coupled to the controller 202 via wired, contact and/or wireless communication. For example, the device 200 may be include one or more data ports or antenna to connect to the device transceiver 206. In the example embodiment, the device transceiver 206 includes one or more transceiver processors 214, associated memory 216, an antenna 218, and an analog interface 220. In some embodiments, the device transceiver 206 includes additional, fewer, or alternative components, including those described elsewhere herein. For example, the device transceiver 206 may include a power storage device (e.g., a battery) to facilitate operation while the device controller 202 is inactive. Similarly, the device transceiver 206 may be configured to operate in a low-power mode to function as described herein while the device controller is inactive. In other embodiments, the device transceiver 206 is at least partially integrated with the device controller 202. In one example, the transceiver processors 214 and/or the memory 216 are part of the processors 208 and the memory 210, respectively. In such an example, the processes and functions of the transceiver processors 214 and the memory 216 may be implemented as dedicated modules or applications within the processors 208 and the memory 210. In another example, each component of the device transceiver 206 is included within the device controller 202.

The device transceiver 206 is configured to communicate data associated with the gaming device 200 to and from the first communication network 106 and determine the relative location of the gaming device 200 as described in detail herein. In particular, the device transceiver 206 is configured to communicate data in accordance with the communication protocols of the first communication network 106. In one example, the first communication network 106 is an ultra-wideband communication network. Ultra-wideband communication, unlike some common types of wireless communication (e.g., Wi-Fi and Bluetooth), is not restricted to heavily populated frequency bands (e.g., 2.4 GHz and 5 GHz). Rather, ultra-wideband communication may be performed at other, less-populated, frequency bands that still provide relatively high data speeds. In one example, the ultra-wideband network may be configured to facilitate communication at a plurality of frequency bands from 3.5 GHz to 6.5 GHz with data rates of 110 kbps, 850 kbps, or 6.8 Mbps. In addition, in comparison to wired communication networks, wireless communication using ultra-wideband facilitates improved portability of the gaming device 200 and increased flexibility for arranging the device 200 within a gaming environment without concern of wire access points and the like. In other embodiments, other suitable types of communication networks that avoid populated or saturated frequency bands may be used for the first communication network 106.

In the example embodiment, the first communication network 106 is a non-persistent communication network. That is, unlike Wi-Fi, which uses routers to maintain a persistent communication signal for connecting devices to the Wi-Fi network, each device communicatively coupled to the network 106 includes a transceiver (e.g., the device transceiver 206) for discovering and establishing communication with other devices. In other embodiments, the first communication network 106 is a persistent network.

The antenna 218 of the device transceiver 206 is configured to receive and transmit data signals with other devices via the first communication network 106. In some embodiments, the device transceiver 206 may include more than one antenna 218, such as one antenna 218 for receiving signals and another antenna 218 for transmitting signals. In the example embodiment, the data signals received and transmitted by the antenna 218 are analog signals. The analog interface 220 is communicatively coupled to the antenna 218 to convert received data signals to a digital format compatible with the transceiver processor 214 and to convert digital data signals from the processor 214 to an analog format for transmission via the first communication network 106.

In at least some embodiments, the device transceiver 206 includes other components that facilitate the operation of the transceiver processor 214, the antenna 218, and/or the analog interface 220, such as, but not limited to, clock generators, phase-lock-loop circuitry, state controllers, power supplies, power management circuitry, filter circuitry, communication interfaces with the device controller 202, and the like. In some embodiments, the device transceiver 206 is powered separately from the device controller 202 to enable communication even if the gaming device 200 is in an inactive (i.e., powered-off) state. In such embodiments, the device transceiver 206 may enter a low-power mode while the gaming device is inactive to conserve power.

With respect again to FIG. 1, the stationary devices 104 are positioned around the gaming environment. Rather than being permanently fixed to a particular location (though some stationary devices 104 may be permanent fixtures), the stationary devices 104 are typically located at a single, predetermined location for a period of time (e.g., one hour, one day, one month, etc.). For example, the stationary devices 104 may include, but are not limited to, gaming tables, building structural components (e.g., walls, stairs, celling panels, etc.), and/or other similar devices. Likewise, although the gaming devices 102 may be moveable or portable, the gaming devices 102 may remain stationary for an extended period of time. In some cases, a gaming device 102 may be deployed at a stationary device 104 until maintenance is required, and some gaming devices 102 may be moved together with the corresponding stationary device 104. As an example, a card-handling device coupled to a gaming table may remain coupled to the table other than during periods of maintenance and may be relocated within a gaming environment together with the table.

For exemplary purposes herein, the stationary devices 104 are stationary gaming tables positioned within the gaming environment. However, the details described below with respect to the gaming tables 104 are not limited to gaming tables and may be applicable to other stationary devices. Moreover, in some embodiments, the stationary devices 104 may include a variety of different types of stationary devices.

Figure 3:
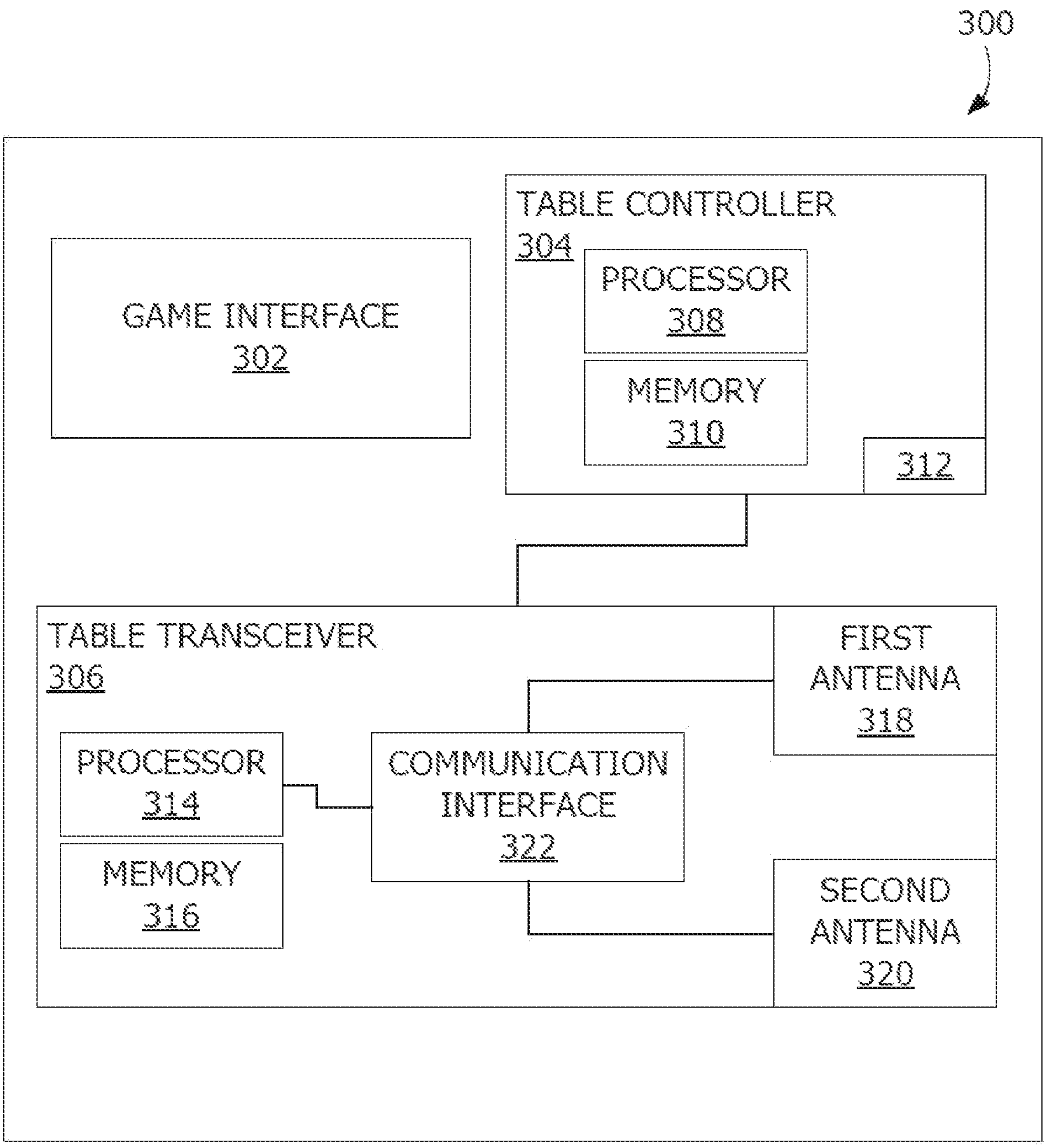
FIG. 3 is a block diagram of an example gaming table according to at least one embodiment.

FIG. 3 illustrates an example stationary gaming table 300 that may be used with a networked gaming device system, such as the system 100. The gaming table 300 includes a game interface 302, a table controller 304, and a table transceiver 306. In other embodiments, the gaming table 300 may include additional, fewer, or alternative components, including those described elsewhere herein.

The game interface 302 is an area of the gaming table 300 that is used for play of a game. For example, the upper felt surface including game symbols on a poker table is the game interface 302. The game interface 302 may be configured to include one or more gaming devices (e.g., the gaming devices 102, shown in FIG. 1) and/or other devices that facilitate play of a game. In one example, the game interface 302 includes one or more displays, lights, and/or input devices for a game.

The table controller 304, similar to the device controller 202 shown in FIG. 2, is configured to monitor and/or control operation of one or more devices associated with the gaming table 300, including the table 300 itself in some embodiments. The table controller 304 includes one or more table processors 308 and associated memory 310 for executing computer-readable instructions to perform the functions of the table controller described herein. The table controller 304 may be configured to coordinate the various devices associated with the gaming table to provide consistent gameplay of the game. For example, if the gaming table 300 includes individual displays for each player, the table controller 304 may be configured to cause each display to display information relevant to the respective players.

In the example embodiment, the table controller 304 includes one or more sensors 312 for collecting sensor data. The sensors 312 may include, but are not limited to, image sensors, pressure sensors, light sensors, audio sensors, and the like. The table controller 304 may analyze the sensor data to determine the state of the game, gaming devices, operators, and/or players associated with the gaming table 300.

The table transceiver 306 is physically coupled to the gaming table 300 and is configured to communicate with the first communication network 106 and the second communication network 112 (both shown in FIG. 1). The table transceiver 306 is further communicatively coupled to the table controller 304 to facilitate communication between the table controller 304 and the first and/or second communication networks 106, 112. In other embodiments, the table controller 304 may be separate and independent from the table transceiver 306. In the example embodiment, the table transceiver 306 includes one or more processors 314, associated memory 316, a first antenna 318, a second antenna 320, and a communication interface 322. The memory 316 stores instructions that, when executed by the processors 314, cause the device transceiver to function as described herein. In other embodiments, the table transceiver 306 may include additional, fewer, or alternative components, including those described elsewhere herein.

In some embodiments, the table controller 304 and the table transceiver 306 may be at least partially integrated with each other. For example, the table processors 308 and the memory 310 may be integrated with the processor 314 and the memory 316, respectively. As another example, the sensors 312 may be incorporated with the table transceiver 306. In other embodiments, the gaming table 300 does not include a table controller 304, and the table transceiver 306 operates independently. In such embodiments, the gaming table 300 may not include devices controllable by the controller 304 or the devices are configured to operate without control from the table controller 304.

The first antenna 318 is configured to transmit and receive data signals via the first communication network 106, whereas the second antenna 320 is configured to transmit and receive data signals via the second communication network 112. The antennae 318, 320 may include more than one antenna each to facilitate communication. In certain embodiments, a single antenna may be used to communicate with both the first and second communication networks 106, 112. The communication interface 322 is communicatively coupled to the antennae 318, 320 to convert data signals between analog and digital formats and perform any other suitable functions to facilitate communication. In certain embodiments, the table transceiver 306 may be divided into separate modules for communication with the first communication network 106 and the second communication network 112. That is, at least the antennae 318, 320 may be separated into different physical modules. The processors 314, the memory 316, and/or the communication interface 322 may be divided between the separate modules. In at least some embodiments, the table transceiver 306 may include other components and subsystems to facilitate the functions described herein. For example, the table transceiver 306 may include circuitry for power supply, power management, signal filtration, state management, other network interfaces, and/or other suitable functionality.

With respect to both FIGS. 1 and 3, the second communication network 112 is configured to facilitate communication with a plurality of gaming tables 300 and other stationary devices using a reduced number of communication nodes 108. That is, the second communication network 112 is configured for relatively long-range, low interference communication to enable one or more communication nodes 108 to communicate with a plurality of gaming tables 104 deployed throughout a gaming environment. In addition, similar to the first communication network 106, the second communication network 112 is configured to facilitate communication outside of the commonly populated frequency bands to avoid signal interference. The second communication network 112 may be a different type of network and/or use a different frequency band in comparison to the first communication network 106. In the example embodiment, the second communication network 112 is a Long Range (LoRa) communication network. LoRa networks communicate using radio signals having frequencies below 1 GHz to facilitate relatively long communication ranges, relatively low power consumption, and/or other network features, such as end-to-end encryption and relatively high communication bandwidth. The use of a wireless second communication network 112 facilitates increased flexibility in deploying the gaming tables throughout a gaming environment, and the use of a LoRa network with a relatively large communication range reduces the number of communication nodes 108 that need to be deployed to communicate with the gaming tables 300. In other embodiments, other suitable types of networks may be used as the second communication network 112. Alternatively, the second communication network 112 may be integrated with the first communication network 106.

The communication node 108 is a network interface communicatively coupled to the server system 110 and the second communication network 112 at a respective gaming environment 101. The communication node 108 facilitates communication between the gaming tables 104 and the server system 110 for data transmission, locating gaming devices 102 within the gaming environments 101, and the like. The communication node 108 may include any suitable network components to communicate with both the second communication network 112 and the server system 110. For example, the communication node 108 may include a transceiver configured to transmit data signals in accordance with the protocols of the second communication network 112. In another example, the communication node 108 may be communicatively coupled with the server system 110 via any form of wireless or wired connections or any combination thereof. By way of example and not limitation, communication between the communication node 108 and the server system 110 may be comprised of serial data links, parallel data links, USB, Ethernet, a Wide Area Network (WAN), a Local Area Network (LAN), infrared communication, IEEE 802.16 (or WiMax), IEEE 802.11a/b/g/n/p, Wi-Fi, and any public cellular phone network including, but not limited to, GSM, CDMA, 3G, or 3GPP Long Term Evolution (LTE), communication, etc.

In the example embodiment, each gaming environment 101 includes one communication node 108 for communicating with the gaming tables 104 at the respective gaming environment 101. In other embodiments, a plurality of communication nodes 108 may be configured to communicate with the second communication network 112 at a single gaming environment 101. Alternatively, a communication node 108 may be configured to communicate with the second communication network 112 over multiple gaming environments 101. In certain embodiments, the communication node 108 may be configured to communicatively couple to the first communication network 106 in addition to or instead of the second communication network 112. In such embodiments, the communication node 108 may communicate with the gaming devices 102 and/or the gaming tables 104 via the first communication network 106. In one example, the communication node 108 is configured to communicate with relatively nearby devices 102 and/or tables 104 via the first communication network 106 (i.e., devices and tables within the effective communication range of the communication node 108 using the first communication network) and to communicate with other tables 104 via the second communication network 112 that has a greater effective communication range than the first communication network 106.

The server system 110 includes one or more server computing devices 114 and a server database 116. The server system 110 may be centralized (i.e., the server computing device 114 and the server database 116 are integrated with each other) or distributed. The server system 110 is configured to collect data from the gaming devices 102 and the gaming tables 104 via the communication node 108 and the second communication network 112, analyze the data, and/or store the data. In one example, the server system 110 monitors usage of the gaming devices 102 within the gaming environments 101. In another example, the server system 110 determines a location of each deployed gaming device 102 as described herein.

The server computing device 114 is configured to execute at least a portion of the tasks performed by the server system 110 as described herein, such as requesting data from the gaming tables 104, analyzing the data from the gaming tables 104, and storing data within the server database 116. In the example embodiment, the server computing device 114 is configured to receive data indicating a relative location of each gaming device 102 for storage and analysis of the location data. In certain embodiments, the server computing device 114

The server database 116 is configured to store data generated by the server system 110 and/or data collected from the gaming tables 104. In some embodiments, the server database 116 is formed by a plurality of distributed databases. In one example, the server database 116 is configured to store data collected from the gaming tables 104, game settings associated with one or more games, usage data for each gaming device 102, reports generated by the server computing device 114, and/or a dynamic map indicating a location of each gaming device 102 within the gaming environments 101.

Figure 4:
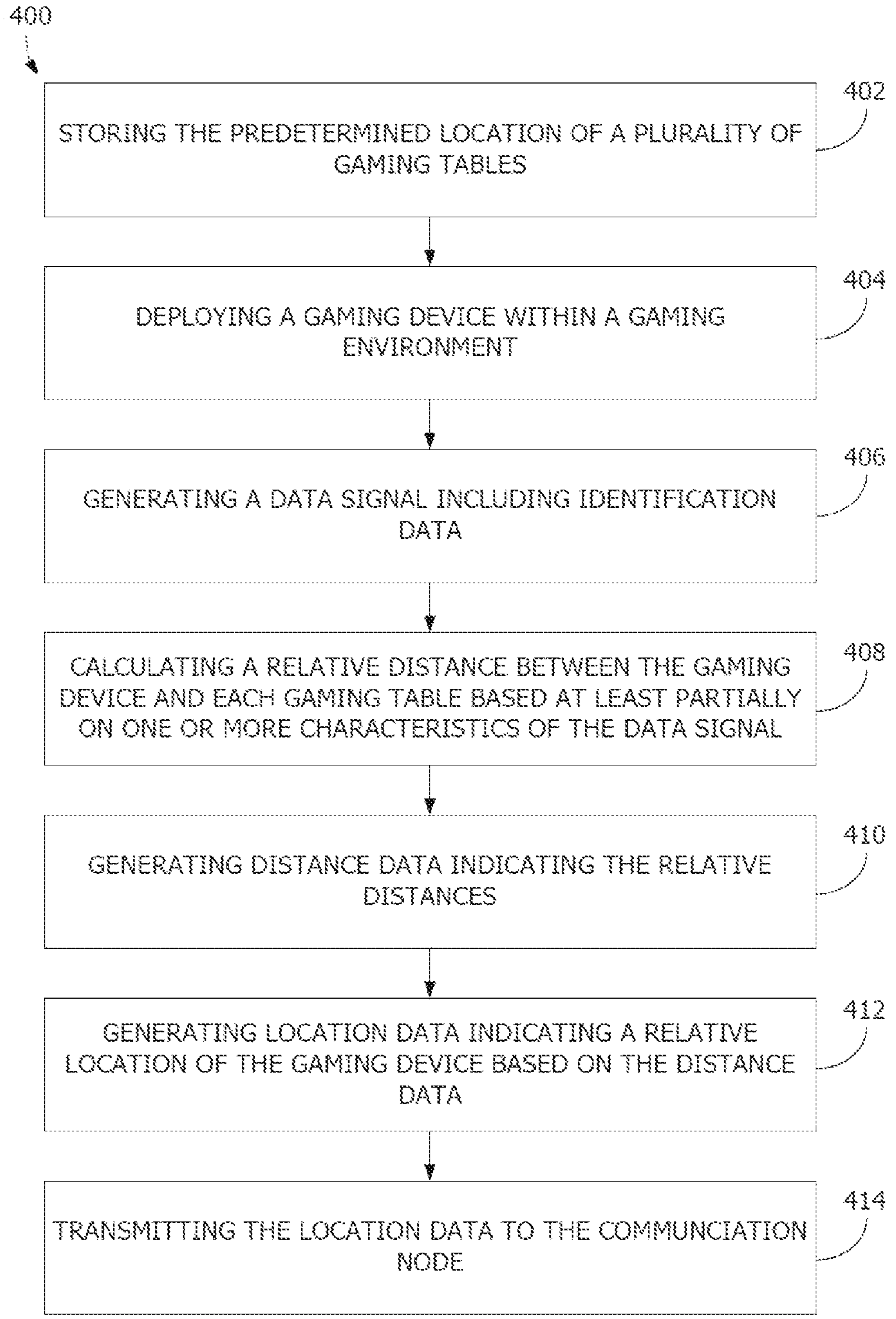
FIG. 4 is a flow diagram of an example method for locating gaming devices using a networked gaming device system in accordance with at least one embodiment.
Figure 5:
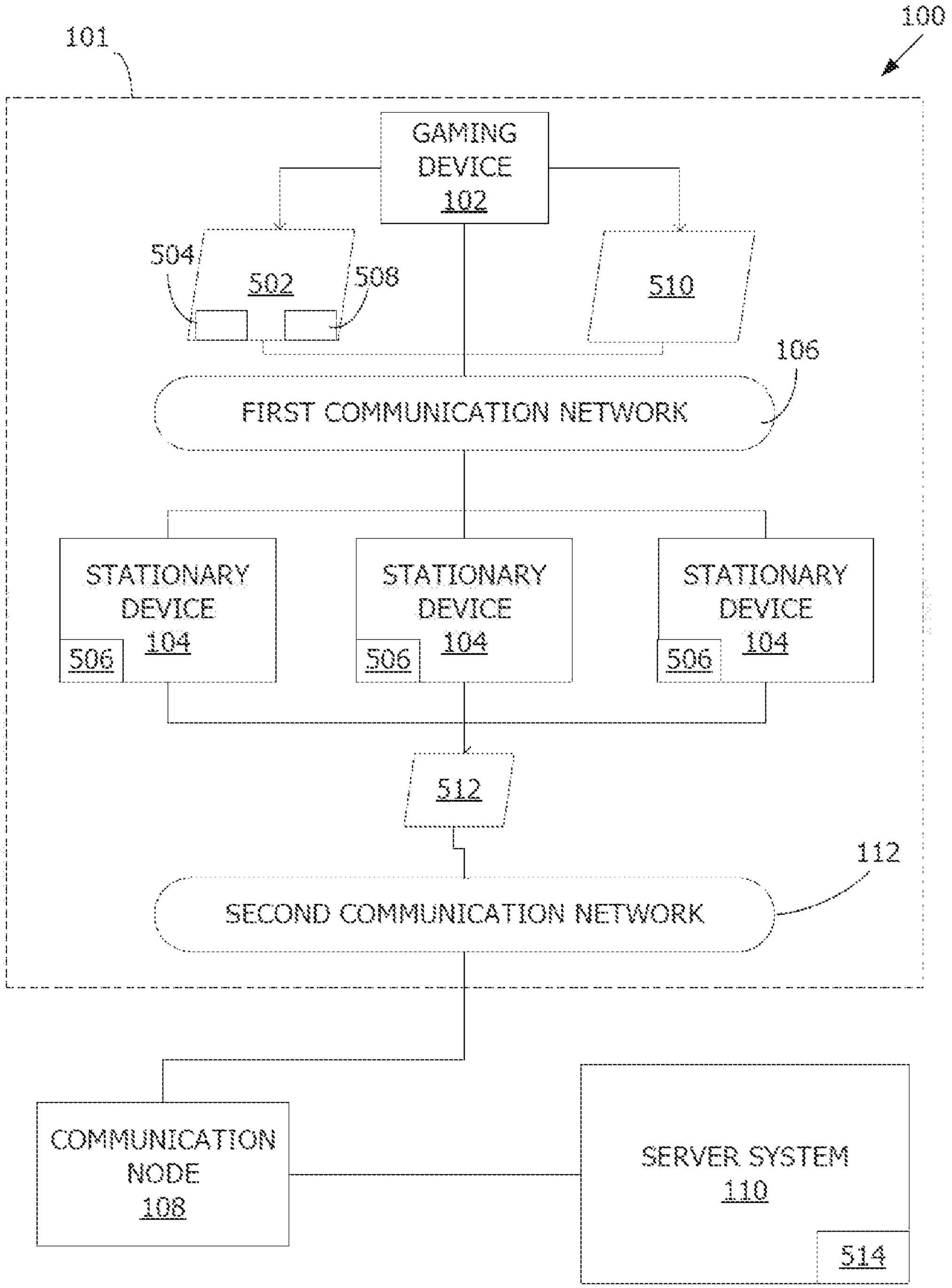
FIG. 5 is a data flow block diagram of the method shown in FIG. 4.

FIG. 4 is a flow diagram of an example method 400 of locating a gaming device 102 within a gaming environment 101 using the networked gaming device system 100. FIG. 5 is a data flow diagram 500 of the method 400 using the networked gaming device system 100. The method 400 may be used to locate a plurality of gaming devices 102 within multiple gaming environments 101 to provide a dynamic map of where each device 102 is located, if the device 102 is active (i.e., in use), and/or what gaming table 104 is associated with each device 102. In other embodiments, the method 400 may include additional, fewer, or alternative steps, including those described elsewhere herein. Moreover, at least some of the steps described herein performed by the gaming device 102, the gaming tables 104, the communication node 108, and/or the server system 110 may be performed using one or more computing devices and/or processors, such as the computing devices and processors described above with respect to FIGS. 1-3.

In the example embodiment, with respect to both FIGS. 4 and 5, the gaming tables 104 are deployed within a gaming environment 101 and establish communication with the communication node 108. The gaming tables 104 have a predetermined location within the gaming environment 101. The location may be provided as, for example, geographical coordinates, coordinates within a map of the gaming environment 101 (and any surrounding areas), and/or other suitable forms of specifying location. In one example, a map of the gaming environment is divided into a grid, where each cell of the grid can be filled with a gaming table 104. In some embodiments, the predetermined location is identified and assigned to the gaming tables 104 manually. In other embodiments, the location of each gaming table 104 is determined automatically by the server system 110 and/or the respective gaming tables 104. In one example in which a gaming table 104 is communicatively coupled to at least three communication nodes 108 via a LoRa second communication network 112, the location of the gaming table 104 may be determined as a function of the timestamps of a data signal generated by the transceiver of the gaming table 104 (e.g., table transceiver 306, shown in FIG. 3) and received by each communication node 108. The server system 110 stores 402 the predetermined location of each stationary gaming table 104 for the location determination described herein. Each stationary gaming table 104 may also store its respective location. In certain embodiments, each gaming table 104 may be associated with one or more games to be played at the gaming table 104. That is, a gaming table 104 is assigned one or more games and, in some embodiments, game settings may be stored by the gaming table 104 for the games.

The gaming device 102 is then activated and deployed 404 within the gaming environment 101. Although each gaming table 104 is assumed to be within communication range of the gaming device 102 for exemplary purposes, other gaming tables 104 may be deployed outside of the communication range of the gaming device 102. When activated, the gaming device 102 is configured to receive 406 data signals 502 including identification data 504 from each gaming table 104 via the first communication network 106. The identification data 504 identifies the gaming table 104 from which the respective data signal 502 originates. The identification data 504 may include, but is not limited to, a unique identifier, a type of game, supported game device and/or other suitable data associated with the gaming table 104 that may be used to locate and configure the gaming device 102. The data signal 502 is received by the gaming device 102 and the identification data 504 is extracted to identify each gaming table 104. In at least some embodiments, the device transceiver and/or the controller of the gaming device 102 (e.g., device controller 202 and device transceiver 206, both shown in FIG. 2) automatically generates a timestamp 506 at the time that each data signal 502 was received. In at least some embodiments, the gaming device 102 is configured to generate the data signal 502 to be received by the gaming tables 104. In such embodiments, the gaming tables 104 are configured to generate the timestamps 506 for each received data signal 502. The data signal 502 may be generated by both the gaming device 102 and the gaming tables 104. For example, one gaming device 102 may receive data signals 502 from the gaming tables 104 and/or other gaming devices 102. In such embodiments, the gaming devices 102 may treat the data signals 502 from other gaming devices 102 similar to data signals from gaming tables 104 for purposes of determining location as described herein. Likewise, in another example, one stationary gaming table may receive data signals 502 from gaming devices 102 and/or other stationary gaming tables 104. In certain embodiments, the data signal 502 may be transmitted in response to a data signal received by the gaming device 102 or the gaming tables 104.

In the example embodiment, one or more characteristics of the data signal 502 may be used to calculate 408 a relative distance between the gaming device 102 and each of the gaming tables 104. The characteristics may include, but are not limited to, amplitude, phase, frequency, phase, time-of-transmission, time-of-flight, time-of-arrival, and/or signal intensity. In one example, if the first communication network 106 is an ultra-wideband network, the characteristic may preferably be a time-of-flight characteristic or a time-difference-of-arrival characteristic. In at least one example, the relative distance between the gaming device 102 and one of the gaming tables 104 is at least partially a function of the frequency of the data signal 502, the speed of light, and/or the time the data signal 502 was received (i.e., the timestamp 506). In some embodiments, the gaming tables 104 generate a respective transmission timestamp 508 and include the transmission timestamps 508 with the respective data signals 502. The internal clocks of the gaming tables 104 may be synchronized to improve the accuracy of the timestamps 508. In such embodiments, the difference between the timestamp 506 at which the signal 502 was received and the transmission timestamp 508 indicates a relative distance between the gaming device 102 and the gaming table 104.

Unlike other types of communication networks, the use of the time-of-flight characteristic or the time-difference-of-arrival characteristic provides improved accuracy of the distance determination in comparison to methods relying upon signal strength, which may be impacted by various other factors beyond distance (especially in gaming environments populated with devices and structures that may impact signal strength). Synchronizing the internal clocks of the gaming device 102 and/or the gaming tables 104 facilitates increased precision in calculating the relative distances.

The gaming device 102 and/or the gaming tables 104 generate 410 distance data 510 indicating the calculated relative distances between the gaming device 102 and each gaming table 104. The distance data 510 may include, but is not limited to, a distance measurement, an identifier of the associated gaming table 104, the timestamp 506, the transmission timestamp 508, and/or other data that facilitates determining the relative distances to the gaming device 102. In some embodiments in which the gaming tables 104 generate the distance data 510, each gaming table 104 generates its respective distance data 510. Alternatively, the gaming device 102 may generate the distance data 510 for the gaming tables 104. In such embodiments, the gaming device 102 may transmit the distance data 510 to each respective gaming table 104.

In the example embodiment, the gaming device 102 collects the distance data 510 for at least a portion of the calculated distances. That is, in some embodiments, the gaming device 102 may filter out distances exceed a threshold distance to reduce computational burden of the location determination analysis described herein. In addition, the gaming device 102 collects the predetermined locations of the gaming tables 104. In certain embodiments, the locations are included within the identification data 504. In other embodiments, the locations are collected via other data signals received by the gaming device 102. The gaming device 102 is configured to determine its relative location within (or near) the gaming environment 101.

The gaming system 102 compares the timestamps and/or distances of the distance data 510 with the predetermined locations of the gaming tables 104. Using trilateration or other suitable location-determination techniques, the location of the gaming device 102 is identified at least partially as a function of the distance data 510. For example, if the relative distances are calculated between the gaming device 102 and at least three gaming tables 104 while accounting for the known locations of the gaming tables, the gaming device 102 can determine the location of the gaming device 102 relative to the gaming tables 104. In comparison to location-determination techniques that use satellites, signal towers, and the like that are remotely located from the gaming environment 101 and susceptible to interference from other devices and structures, determining location relative to the gaming tables 104 facilitates improved accuracy in the location determination of the gaming device 102. Moreover, by performing the location determination locally at the gaming device 102, the location can be determined even without reliance on external computing systems. In certain embodiments, rather than determining a specific location of the gaming device 102, the gaming device 102 identifies a gaming table 104 associated with the gaming device 102 as described herein and assigns itself the predetermined location of the associated gaming table 104.

In response to determining its relative location, the gaming device 102 generates 412 location data 512 to be transmitted to the communication node 108. The location data 512 indicates the relative location and may also include other suitable data, such as a game data, maintenance scheduling data, and/or the like. The gaming device 102 may transmit 414 the location data 512 to the communication node 108 via one or more gaming tables 104 and the second communication network 112. The communication node 108 collects the location data 512 and transmits the data 512 to the server system 110 for storage and analysis. In some embodiments, the gaming tables 104 and/or the server system 110 may generate the distance data 510 and/or the location data 512 rather than the gaming device 102. In such embodiments, the gaming tables 104 and/or the server system 110 may collect the corresponding data to generate the distance data 510 and/or the location data 512. In one example, the gaming device 102 generates the distance data 510 and transmits the distance data 510 to the server system 110. The server system 110 then generates the location data 512 as a function of the predetermined locations of the gaming tables and the distance data 510.

The method 400 may be repeated for a plurality of gaming devices 102 such that the server system 110 may identify and monitor the location of every gaming device 102 deployed within the gaming environment 101. In at least some embodiments, gaming devices 102 that are not deployed within the gaming environment 101 may notify the server system 110 of its location. In one example, at least some gaming devices 102 may include power storage devices (e.g., batteries) and/or low-power modes to facilitate location determination while the gaming devices 102 are not deployed. In other embodiments, the absence of a location determination by a particular gaming device 102 may be inferred that the gaming device 102 is not deployed and inactive. These gaming devices 102 may be in storage, maintenance, at other gaming environments 101, and the like. Monitoring the location of the devices 102 may provide increased awareness of the how the gaming devices 102 are being used.

In at least some embodiments, the server system 110 is further configured to generate a dynamic map 514 of the gaming environment 101 that identifies the location of each gaming device 102 and each gaming table 104. The dynamic map 514 may be presentable to an operator for analysis. The location of the gaming devices 102 may be updated over time to monitor the current and historical movements of the gaming devices 102. The server system 110 may be configured to prompt the gaming devices 102 and/or the gaming tables 104 to generate the location data 512 periodically to update the dynamic map 514. In other embodiments, the gaming devices 102 and/or the gaming tables 104 may generate location data 512 in response to the gaming devices 102 moving relative to the gaming tables 104 and may transmit the location data 512 to the server system 110 via the communication node 108 to update the dynamic map 514. Alternatively, in embodiments in which the server system 110 generates the location data 512, the gaming devices 102 and/or the gaming tables 104 transmit updated distance data 510 to the server system 110 to update the dynamic map 514.

Figure 6:
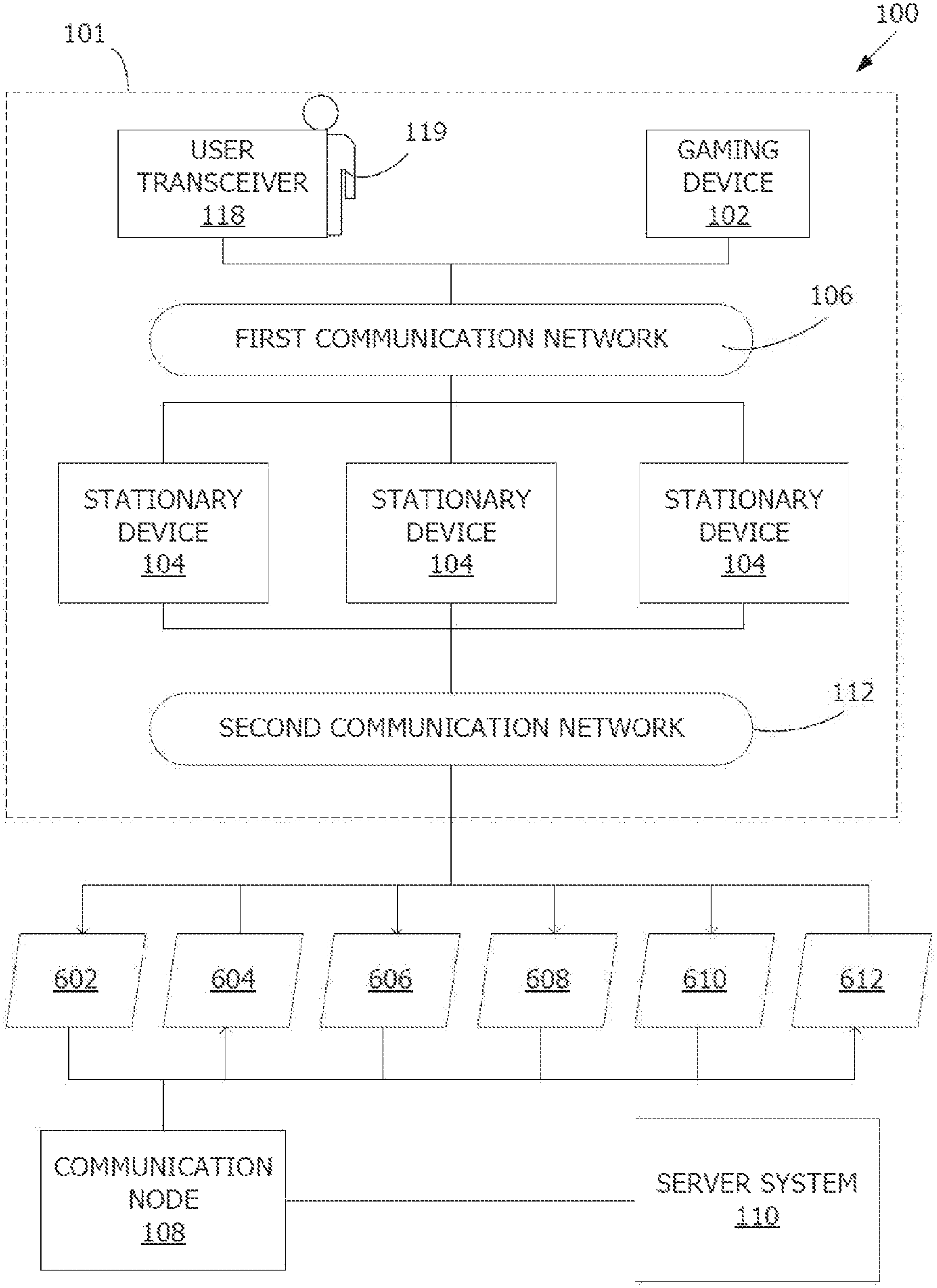
FIG. 6 is a data flow block diagram of data transmitted and generated by a networked gaming device system in accordance with at least one embodiment.

The networked gaming device system 100 is not limited to locating gaming devices 102 within a gaming environment 101. For example, the system 100 may also be used to generate and transmit gaming data, game settings, device data, usage data, and other suitable data associated with the system 100. FIG. 6 is a data flow diagram of exemplary data transmitted within the system 100 (shown in FIG. 1). In other embodiments, other data may be transmitted and/or generated by the system 100, including data described elsewhere herein.

In the example embodiment, a gaming device 102 may be associated with a particular stationary gaming table 104. For example, a card-handling device may be deployed to a table for play of a card-based game, such as blackjack or poker. Associating the gaming device 102 with the gaming table 104 may facilitate certain, and/or prevent certain, functionalities of the gaming device 102 and the gaming table 104. For example, other than data signals transmitted for location determination (e.g., the data signal 502, shown in FIG. 5), the gaming device 102 or the gaming table 104 may block other data from being transmitted to and/or received from unassociated devices. The associated gaming device 102 and gaming table 104 may be configured to generate and communicate game data 602 associated with play of the game. In at least some embodiments, the gaming device 102 is associated with a gaming table 104 based at least partially on the relative distances between the gaming device 102 and one or more gaming tables 102. For example, if the relative distance to the gaming table 104 is within a threshold predetermined distance (e.g., one meter or half of a meter) and no other gaming table 104 has a similar relative distance, the gaming device 102 may be associated with the relatively close gaming table 104. The association may also be partially based on the type of gaming device 102 and what game is to be played at a particular gaming table 104. For example, the gaming device 102 and/or the gaming tables 104 may broadcast game type, device type, and the like to each other. Based on the broadcasted data, the gaming device 102 and/or the gaming tables 104 determine whether or not the gaming device 102 is compatible. If a gaming device 102 is determined to be incompatible (e.g., a card-handling device for a dice-oriented table game), the gaming device 102 may ignore the incompatible gaming table 104 irrespective of its relative distance.

The association may be determined by the gaming device 102, the gaming tables 104, and/or the server system 110. In some embodiments, the gaming tables 104 and/or the server system 110 may store game settings 604 to configure the gaming device 102 for the game. The game settings 604 may include, but are not limited to, rules of the game, number of cards shuffled, number of available card decks, card information, artwork, animations, wagering thresholds, and/or other configurable aspects of the gaming device 102. The game settings 604 may be transmitted to the gaming device 102 in response to associating with the gaming table 104. The gaming device 102 may automatically be configured in accordance to the game settings to reduce necessary time to manually prepare the gaming device 102.

In response to associating the gaming device 102 to a gaming table 104, the gaming device 102 may transmit data to the gaming table 104 to be collected by the server system 110 via the communication node 108. The data may also include data generated by the gaming table 104. In some embodiments, the server system 110 is configured to periodically collect the data from the gaming tables 104 (i.e., via polling). In other embodiments, the gaming tables 104 transmit the data asynchronously to the communication node 108 for storage and analysis by the server system 110. At least some data may remain local to the associated gaming device 102 and gaming table 104 (i.e., the data is not transmitted to the communication node 108). The data may include, but is not limited to, the game data 602, device data 606, and location data 608 (e.g., the location data 512, shown in FIG. 5). The game data 602 includes data associated with the game played at the gaming table 104. Examples of game data 602 may include, but are not limited to, wager amounts, wagered outcomes, payouts, game outcomes, progressive jackpot amounts, number of players, bonus game outcomes, number of cards or decks remaining, image data associated with the game, number of shuffles, game play events, game sessions, use in a period, and/or other suitable data associated with the game.

The parameter of the number of shuffles can represent the number of full deck shuffles performed by the gaming device 102. When multiple decks are shuffled, the parameters can reflect the total number of decks shuffled. The parameter of the number of cards shuffled can represent the number of cards shuffled by the gaming device 102. In an embodiment when a particular card is shuffled multiple times over the course of a time period, the parameter is incremented each time the card is shuffled. In another embodiment, a card is shuffled once when the card is part of a shuffle process in which one or more decks of cards are completely shuffled.

The parameter of a game play event can represent the number of completed games/hands at a table 104. For example, one game play event for blackjack represents the dealing of cards between the placement of an initial bet and the final result of the hand. In one embodiment, if there are five players at a table, the completion of one hand for all players and the dealer represents five game plays, in some embodiments the dealer's hand is also counted so this represents six game plays, in another embodiment this represents one game play.

The parameter of a game session can represent a series of game plays/deals for a particular type of game played such as blackjack, THREE CARD POKER®, etc., without a significant break in play. For example, if a gaming device 102 is used for THREE CARD POKER® and is in continuous use, e.g., shuffling and dealing cards with no more than a five minute break (other break period criteria can be used), for six hours, then the gaming device 102 is used for blackjack, then the six hours of THREE CARD POKER® is one game play session.

The parameter of use in a period can represent the total amount of usage of the gaming device 102 in a period. Examples of usage are number of shuffles, number of cards shuffled, number of game play events, and/or game sessions.

The information can assist in identifying trends in the amount of game plays of particular games, e.g., THREE CARD POKER®.

The device data 606 includes operating conditions, diagnostics, maintenance reminders, and/or other data associated with the gaming device 102. At least some of the device data 606 is collected by sensors (e.g., the sensor system 204, shown in FIG. 2) monitoring the gaming device 102.

In at least some embodiments, the server system 110 collects the game data 602, the device data 606, and/or the distance data 608 to generate usage data 610 associated with each gaming device 102. In some embodiments, the data received by the server system 110 may be collectively referred to as "operational data." The usage data 610 indicates how long the gaming device 102 has be active and in use, under what conditions, and/or other similar factors. The usage data 610 may be used to proactively identify gaming devices due for maintenance prior to device failure and/or to accurately monitor the use of rental or leased gaming devices within the gaming environments 101. Moreover, because the server system 110 monitors multiple gaming environments 101, the usage data 610 of gaming devices 102 that are deployed in multiple gaming environments over time may be captured by the system 100. The server system 110 may be configured to generate and present reports including the operational data for one or more gaming devices 102 and/or other data associated with the system 100. In certain embodiments, each gaming device 102 may be configured to generate its respective usage data 610 and transmit the usage data 610 to the server system 110 for storage and analysis.

In at least some embodiments, the system 100 may be used to facilitate leasing gaming devices 102 to operators of the gaming environments 101. In particular, the system 100 may facilitate billing based on actual usage of the gaming devices 102. In some embodiments, the system 100 permits the reporting period, and any associated billing period, to be of any duration and based on any type of, or combination of, use. In other embodiments, billing amounts may include maintenance charges, fees, or other payable service events. Types of use for a card-handling gaming device include, but are not limited to, cards or decks inserted into the card device, cards dispensed, cards counted, cards sorted, cards or decks checked for completeness, individual hands dealt, type of game played, individual games played, game sessions played, directly or indirectly based on any amount of winnings detected during play including any progressive, individual hand reports and game reports generated, and/or request for a report from a past card usage, past game or past session data including individual hands previously generated (past data may help a casino with a patron dispute, may help with a billing dispute, etc.). This may be downloaded to a card-handling device from a central location (e.g., the server system 110) where extended game data associated with each card-handling device may be stored, or, otherwise provided to a user (casino, operator) of the local card-handling device, if the device is unable to communicate or display the results of the request. Such data, billable events, and recallable events are based on the capabilities of each card-handling device. The level to which each card-handling device may record data in any form is reflected in the data kept at a central location for later recall, analysis, and use. Unsophisticated card-handling devices with limited reporting capabilities will have equally limited data available from any back-end system, while sophisticated card-handling devices will enable a back-end system to keep far more detailed records, respond to download requests for specific data and similar actions. The type of data available from a sophisticated card-handling device is limited only by its detectors and associated computer power. Any type of data related to card usage, deck usage or deck type (including, but not limited to, the deck's manufacturer and other data), deck or card count of any kind, ordering in a randomized deck or partial deck, data for each dealt or issued card for any event (including card counting or deck determinations, as well as game play events), and any other type of count or event based on cards in any manner used in a card-handling device is contemplated herein.

The collected data may be organized, analyzed, and reported in any manner useful for either billing, meaning creating bills for payment eventually sent to the user of the device, or, maintenance of any type, including actual and predictive failure analysis and/or predictive required maintenance reports. Predictive reporting may be based in part, or in whole, on statistical analysis of the use data, error logs, interrupt events, fault reports, and any and all data, if available, from detectors or detection circuits, detection ICs, or any type of element that is configured to log or generate data regarding the condition of any element, either itself or another element. In at least some embodiments, the server system 110 and/or the gaming devices 102 may generate one or more alerts or notifications to notify a user of particular events based on analysis of the operational data.

Examples of detector elements includes elements such as strain detectors or motion detectors located on, or associated with, mechanical components, and, failure detection ICs measuring various electrical/electronic properties of components so that anomalous events can be reported or logged. Similarly, detection elements may be failure detection (or condition monitoring) circuits contained in larger circuits reporting/logging performance deviations or apparent out-of-spec behaviors, and/or any other detection elements that generate logs, interrupts, or other events. This further includes firmware or software that may use algorithms coupled with input from one or more components or elements of any type (mechanical elements using or interfacing to mechanical-electrical, mechanical-optical, or other elements, all electronic elements, etc.) to generate data or report on actual, possible, or predictive failure events. This is by way of example only, the concept covers collecting and/or using or evaluating any data from failure detection elements, as implemented in various models of card-handling devices now or in the future.

In some embodiments, the server system 110 may be configured to at least partially control the operation of the gaming devices 102 by transmitting control data 612 to the gaming devices 102 via the gaming tables 104. The control data 612 may automatically cause the gaming device 102 to reconfigure and/or to perform one or more tasks. For example, if a gaming device 102 is identified as potentially malfunctioning based on the data received by the server system 110, the server system 110 may transmit control data 612 to cause the gaming device 102 to shut down and/or perform a diagnostic operation to identify a cause of the malfunction. In some embodiments, the gaming device 102 is configured to apply the control data 612 in response to associating with the gaming table 104. Otherwise, the gaming device 102 may ignore the control data 612. In other embodiments, the gaming device 102 may apply at least some control data 612 (e.g., diagnostics functions, shut down functions etc.) irrespective of the gaming device 102 associating with the gaming table 104.

In certain embodiments, the system 100 may further include user transceivers 118 for tracking the location of users within the gaming environments 101, such as employees and/or players. Each user transceiver 118 may be substantially similar to the device transceivers 206 shown in FIG. 2, though, in some embodiments, the user transceiver 118 may be different from the device transceivers. For example, the device transceiver 206 may be integrated with the device controller 202 (shown in FIG. 2), whereas the user transceiver may be a standalone apparatus. The user transceiver 118 is affixed to, coupled to, or held by a user 119 or the garments of the user 119.

The user transceiver 118 is configured to be incorporated within the method 400 (shown in FIG. 4) to determine the location of the user 119 similar to the determining the location of the gaming devices 102. For example, the user transceiver 118 communicates with the gaming tables 104 via the first communication network 106 to determine a relative distance between the user 119 and each gaming table 104. Based on the determined relative distances, the user transceiver generates location data indicating a relative location of the user. The location data is then transmitted to the server system 110 for storage with location data of other users and analysis. In certain embodiments, if the user 119 is an employee of the gaming environment, the user transceiver 118 may be configured to identify a role or position of the user 119. For example, if the user 119 is a card dealer, the user transceiver 118 may transmit identification data indicating the user 119 is a card dealer to the gaming tables 104. In some embodiments, the user transceiver 118 may be configured to collect and generate other suitable data, such as performance data, time spent at a particular gaming table 104, and the like.

Figure 7:
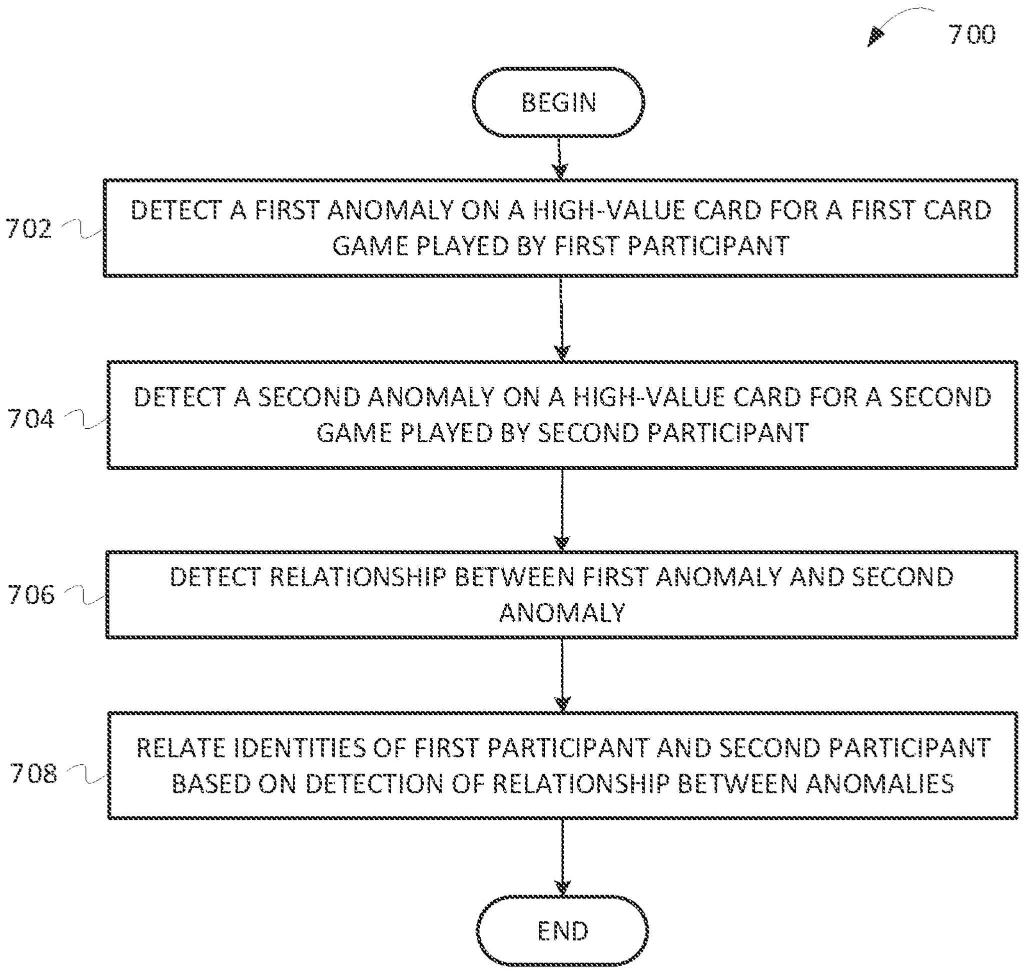
FIG. 7 is a flow diagram of an example method for tracking potential collusion amongst players in accordance with at least one embodiment.
Figure 8:
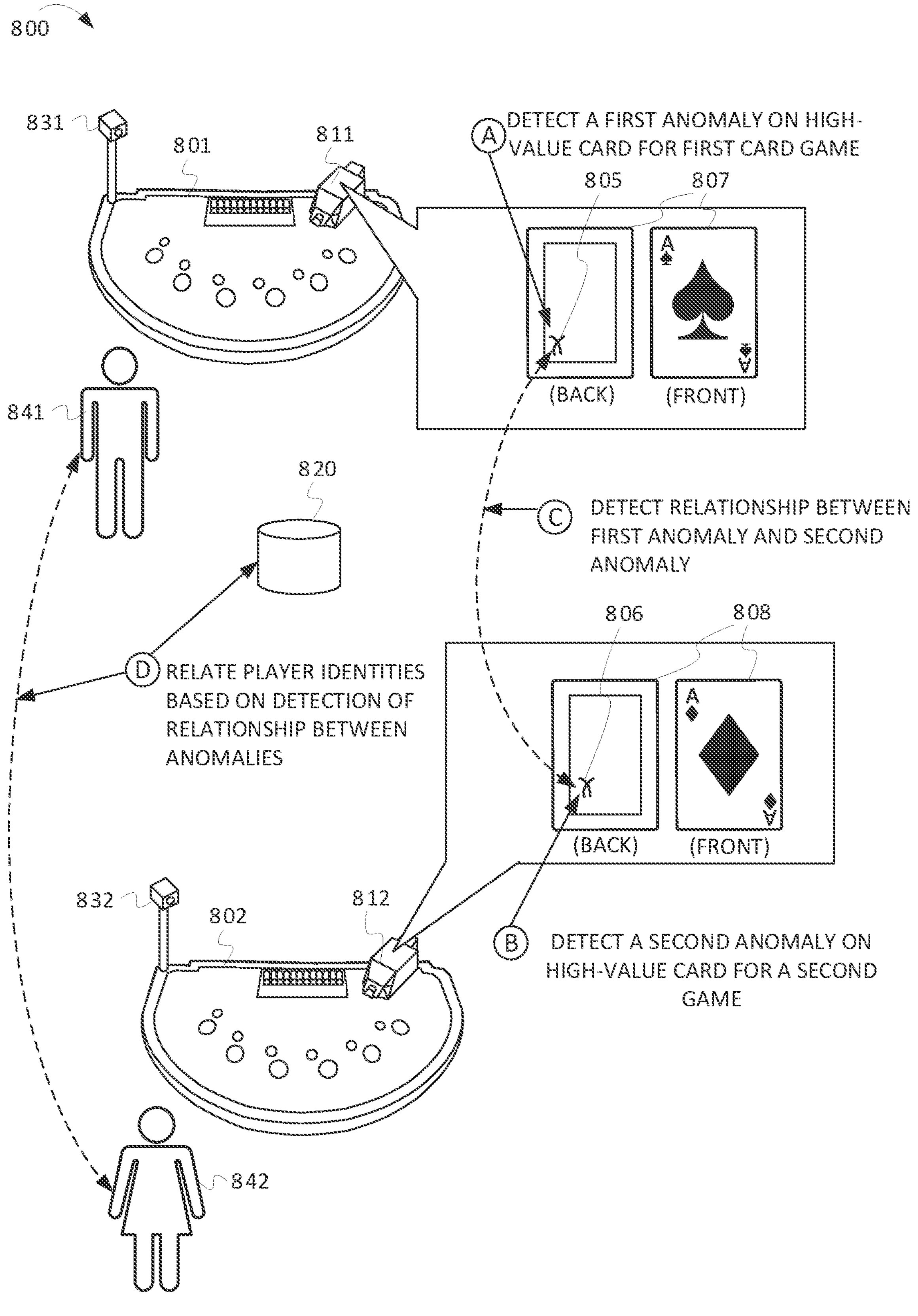
FIG. 8 is a diagram of tracking potential collusion amongst players using a networked gaming device system in accordance with at least one embodiment.

FIG. 7 is a flow diagram of an example method for tracking potential collusion amongst players using a networked gaming device system in accordance with at least one embodiment. Casinos have a strong interest in catching cheaters. Cheating players rob casinos of potential profits, leading to a possible debt or financial troubles for a casino. In some embodiments, the networked gaming device system described herein is configured to protect the casino against lost winnings by detecting possible collusion between players across a networks of gaming devices. FIG. 8 illustrates one example according to the flow 700 and will be described in connection with FIG. 7.

In FIG. 7, a flow 700 begins at processing block 702 where an electronic processor detects a first anomaly of a high-value card for a first game played by a first participant. For example, FIG. 8 illustrates a system 800 of networked gaming devices similar to system 100 (or any other system described herein). In some examples, the system 800 includes a plurality of gaming tables (801, 802) connected via a network of movable gaming devices, such as a network of movable card-handling devices, including shufflers 811 and 812. The system 800 may also include other devices, such as card sorting and dispensing devices (e.g., shoes) that receive a deck of shuffled cards (e.g., by hand or directly from a shuffler) and which dispense the shuffled cards. The shufflers 811 and 812 illustrate examples of shufflers that incorporate shoes.

The system 800 may further include a database 820 used to store and track data, such as indicators of potential collusion amongst players. In one example, the database 820 is similar to the database 116 illustrated in FIG. 2.

The system 800 further includes sensors that track activities and information in a gaming environment. One example of sensors that track the gaming environment include cameras 831 and 832. The cameras 831 and 832 (or other sensors) may be those associated with a gaming system according to the disclosure of, for instance, US Patent Application Publication No 2020/0098223 (Kelly et al.), which disclosure is incorporated by reference herein in its entirety.

Several stages of activity are illustrated in FIG. 8. The description of FIG. 8 refers to "processor of the system 800" or more succinctly a "processor," which may be, for instance, one or more of processor 208 of device controller 202, processor 308 of table controller 304, a processor for the server system 110, server computing device 114, any combination of processors, etc. The processor (or combination of processors) tracks information about the system 800 and the gaming environment and uses the information. The information may include, but is not limited to, times that certain activities occurred (e.g., play actions, betting, conversations, card touches, etc.), information about the table 802 (e.g., a table identifier), information about the shuffler 811 (e.g., a shuffler identifier, shuffle times, shuffle-states, anomaly data, etc.), information about gaming environment (e.g., information about the rounds of play, the players, chips, bet amounts, etc.), and so forth.

Still referring to FIG. 8, at, stage "A," a processor detects a first anomaly 805 on a first card 807. In one example, the processor (e.g., processor 208) detects the anomaly 805 on the first card 807 in response to automatic shuffling of a set of cards by the shuffler 811. The processor observes (e.g., via sensors in the shuffler 811) the surfaces, edges, corners, etc. of the playing cards, including the front and back of the playing cards, as the deck is being shuffled. The processor detects anomalies utilizing the sensor devices. For example, the sensors can be one or more sensors described herein (e.g., sensor system 204) and/or in US Patent Application Publication 2007/0238502 (Pokorny et al.), which is incorporated by reference herein in its entirety. In some instances, the processor may scan and analyze a back and/or front of a playing card utilizing the one or more sensors. The sensors may include a camera that takes an image of a card (e.g., front and/or back of the card), a laser that measures surface indentations or folds of the card, a UV light that illuminates potential inks that may have been put on the cards by players, etc. In one example, after the processor takes an image of a back of the first card 807 (via the shuffler sensor(s)), a processor (e.g., processor 208 or of server computing device 114) compares an image of the back of the card 807 against a previously taken image of the card 807 (e.g., compares the image of the card against an original image of the card taken when first shuffled and/or against any image of the card taken thereafter). For instance, in one embodiment the shuffler 811 has a feature to designate when a fresh deck is shuffled. Thus, when the shuffler 811 shuffles the deck for the first time, a processor (e.g., processor 208) takes images of what the card looks like in its original, perfect form. Further, the processor analyzes the front of the card to determine its card value. The processor can further assign a card identifier that is uniquely specific to the particular card value for that particular deck (the processor can store the card identifier in a memory associated with the shuffler 811, the table 801, the server 110, etc.). The next time the shuffler 811 subsequently shuffles the deck, the processor takes images of the front and back of the card. The processor analyzes the front of the card again to determine its value, and thus its card identifier. For instance, the processor associates (e.g., creates a relational link in memory) between the card identifier and the new images. In one embodiment, after taking and associating the new images with the identifier, the processor compares the new image of the back of the card against the original image of the back of the card taken during the first shuffle. The processor can further run additional scans, such as UV light scans, laser scans, etc. and compare the new scan data against previously take scan data (e.g., taken during the first shuffle). If the processor's analysis of the card detects a difference between the new image (or scan data) and the previously recorded image/scan data, then the processor creates a unique identifier for the anomaly and associates (e.g. in memory) analysis results with the anomaly identifier. The processor thus builds a map, over time, of the card and the anomalies on the card. In some embodiments, on subsequent shuffles after the second shuffle, the processor may compare new image/scan data against only the most recently taken images when the deck was last shuffled. In some embodiments, the processor that analyzes the images of the card may be local to a shuffler device on a shuffler network (e.g., processor 208). In other instances, the processor may be elsewhere (e.g., processor 308 of table controller 304, or the processor server computing device 114), and is configured to receive and analyze data via computer vision, such as by a machine learning model (e.g., an artificial neural network, a decision tree, a support vector machine, etc.). In some embodiments, the processor automatically detects, via a neural network model, physical objects as points of interest based on electronic analysis of an image, such as via feature set extraction, object classification. For example, the processor can detect one or more points of interest by detecting, via the neural network model, physical features of the image of the card 807. Based on detected physical features of the analyzed image of the card (e.g., the shape and position of the pixels associated with the pip symbols, the letter or number symbols, the colors, etc.) the neural network model predicts a value of the card to within a given level of accuracy. In some instances, the processor determines whether the accuracy is above a given threshold (e.g., a 99% accuracy). For instance, the neural network model determines that the shape and location of the physicals features represent an "A" or "Ace" symbol. The neural network model, thus, classifies the card value according to its value (e.g., rank and suit). The processor may be associated with a tracking controller configured to monitor the gaming area (e.g., physical objects within the gaming area), and determine a relationship between one or more of the objects. The tracking controller can further receive and analyze collected sensor data (e.g., receives and analyzes the captured image data from a camera) to detect and monitor physical objects. The tracking controller can establish data structures relating to various physical objects detected in the image data. For example, the tracking controller can apply one or more image neural network models during image analysis that are trained to detect aspects of physical objects. In at least some embodiments, each model applied by the tracking controller may be configured to identify a particular aspect of the image data and provide different outputs for any physical objected identified such that the tracking controller may aggregate the outputs of the neural network models together to identify physical objects as described herein. The tracking controller may generate data objects for each physical object identified within the captured image data. The data objects may include identifiers that uniquely identify the physical objects such that the data stored within the data objects is tied to the physical objects. The tracking controller can further store data in a database.

In some instances, a processor (e.g. processor 208) detects that the first card 807 is a card of high value. A card of high value is a card with a value that is highest (or within a range of the highest) according to game rules and/or optimal game-play strategy. For example, a deck of standard playing cards may include a set of cards having specific ranks relative to each other based on their suit. A high card in a game of Poker (and variants of Poker game), for example includes an Ace, face cards (in descending order of rank), and a 10. Examples of high-value cards in Black Jack (and variants of Black Jack games) include Aces, face cards, and a 10. Examples of high-value cards in Baccarat (such as Punto Banco) includes 6, 8, 8 and 9. Cards of high value may vary based on some variations of games. In some instances, a card of high value includes any card with a value that has a potential of providing an advantage that would result in an advantaged bet on a potential winning card hand of the card game.

In some instances, the processor analyzes the image data in response to determining that the first player 841 won suspiciously. For example, in some embodiments, the processor may look for potential anomalies only after determining that the first card 807 was dealt during a round of play in which a first player 841 participated. Further, the processor detects whether the first player 841 played, during the round of play, in a manner that was inconsistent in timing, betting amount, playing strategy, etc. For example, the processor may detect that a higher-than-average bet was placed (e.g., by the first player 841) during the playing round of the first card game. In some embodiments, the processor can determine whether a card of high-value was used (or whether any particular card was dispensed) during the playing round by analyzing image data taken from a shoe at the table. In other embodiments, the processor deduces which cards were dispensed based of a number of the cards dealt and a comparison to a shuffle state for the cards made from the last shuffling round by the shuffler 811. As mentioned, each time a shuffler shuffles the deck, a processor can record information about the cards. For instance, during the shuffle of the deck before the round of play of the first card game, the processor (e.g., of shuffler 811) records shuffle-state data for the shuffled state of the deck. The shuffle-state data includes time stamps, card values, and other information that identifies the order of the cards in the shuffled deck. The processor accesses and analyzes the shuffle-state data for a round of shuffling (that occurred immediately before the cards were dispensed for the playing round of the first card game. The shuffler 811 also includes a return bin for cards used during a playing round. Based on the number of cards returned to the bin, the shuffler knows the number of cards used during any given playing round. Thus, the shuffler uses the number of cards dispensed for each round in a comparison to the order of the cards indicated by the previous shuffle-state data to determine the numbers of cards dispensed (e.g., returned to the bin) for each round. Thus, the processor knows which cards from the shuffled deck were used (e.g., visible) during round of play. In yet other embodiments, the processor detects cards that were dealt during the round of play in response to analysis of image data of the cards via one or more environmental cameras (e.g., cameras 831 and/or 832).

Referring momentarily back to FIG. 7, the flow 700 continues at processing block 704 where an electronic processor detects a second anomaly on a high-value card for a second game played by a second participant. For example, in FIG. 8, at stage "B," a processor (e.g. processor 208) detects a second anomaly 806 on a second card 808 for a second card game. The second card 808 was, at some previous point, shuffled by the second shuffler 812 and the shuffled cards were used in the second card game (e.g., in a card game played at table 802, or in another embodiment on a second card game played on the table 801 at a different time). In some embodiments, the processor detects the second anomaly 806 in response to detecting the first anomaly 805. For example, in response to detecting the first anomaly 805, the processor can query the system 800 (e.g., query another shuffler, query a server, query a table, etc.) for shuffle data obtained by the network of shufflers (including querying the system 800 for shuffle data generated by shuffler 812). The processor can access data stored in a memory associated with the shuffler 812, the table 802, a server (e.g., server system 110), or any other device communicatively coupled to the shuffle network. In one instance, after detecting the first anomaly 805, the processor searches the shuffle network and/or shuffler network data for a shuffler that was configured with the same game (or game variant) as was the shuffler 811. If the search result indicates that shuffler 812 was configured with a same game (or game variant), then the processor may access data specific to the shuffler 812 and run further searches on the shuffler data and/or analyze the shuffler data (e.g., to detect anomalies on one or more cards of high value that the games have in common).

In some instances, the processor analyzes image data and detects the presence of the second anomaly 806 in the course of shuffling a deck of cards used for the second card game. The processor can store the results of the analyzing. For example, the processor stores an indication of the presence of the anomaly 806 and links it to identity values for one or more of the shuffler 812, the table 802, the shuffle state (e.g., shuffled card order) of the cards during the round of play of the second card game, the card value of the card 808, etc. Thus, after detecting the first anomaly 805 (from the playing round of the first card game), the processor can search the network for the data related to the already detected second anomaly 806. In other instances, however, the processor may not have previously analyzed the image data and/or shuffle-state data of cards associated with the round of play of the second card game, but may have stored the data for later analysis. In such an example, the processor may be limited in the starting information for the search. For example, the processor may only be able to search on game type for the shufflers. Thus, the processor could narrow the search by first searching for (and detecting) whether any shufflers on the shuffler network had been configured for a given type of card game. For example, the processor compares the current game type (being played at the first table 801) to detect matching indicators in the shuffle-network data of another game session where any shuffler was used to play one or more of an equivalent base game type, an equivalent game theme, an equivalent game title identifier, a game with equivalent game rules, etc. For example, the processor determines that the game type for the first shuffler 811 is a variant of poker and also detects that a second table 802 has/had a matching game type (e.g., was also a variant of poker). The variants of poker, while having some variations in some game rules, possess (by the nature of being a variant of the game "poker") at least some similarities in playing strategies because they utilize at least some equivalent high-value cards. After the processor searches the shuffle-network data and determines that second shuffler 812 was configured for the same type of card game (or a variant) as the first card game, the processor can select image data of the set of cards taken by the shuffler 812 for times that it was configured for the similar type of game. The processor can then analyze the image data to detect the second anomaly.

In another example, the processor detects the indication of the second anomaly in response to determining that the first card game and second card game utilize the equivalent high-value cards. For example, the processor can compare a first set of high-value cards (associated with the first card game) to a second set of high-value cards (associated with the second card game), and determine that there is at least one matching high-value card in the sets, and that the at least one matching high-card value is the same as the value of the first card.

Referring momentarily back to FIG. 7, the flow 700 continues at processing block 706 where an electronic processor detects a relationship between the first anomaly and the second anomaly. For example, in FIG. 8, at stage "C" a processor detects a relationship between the first anomaly and the second anomaly. Anomalies may be a physical mark or disturbance on the cards that varies from an original manufactured appearance (e.g., a scratch, a fold, an indentation, a hole, a smudge, a scuff, a stain, an ink, an asymmetry, etc.). An anomaly may also include an orientation of the cards relative to other cards. For instance, one method cheating players may employ is called edge sorting. Edge sorting involves identifying specific cards that have a manufacturing defect on the back of the card (e.g., an asymmetry to a pattern on the back of some cards that were cut improperly during manufacturing). During the edge sorting, the cheating player manipulates a dealer into turning some of the cards (e.g., the high-value cards that may have the defect) around one-hundred and eighty degrees in orientation so that they are oriented in the deck differently from other cards in the deck. The defect is visible on the reoriented card, and thus can be used by the player to identify certain card values by looking at the defect on the back of the cards. Thus, high value cards can be identified by the cheater due to the asymmetrical pattern on the backs of the improperly cut cards. Thus, the processor may, for instance, analyze images taken of the back of a card and detect whether the card is oriented differently in relation to other cards in the deck (an indication of a card in a different orientation may indicate potential cheating).

In some embodiments, the processor may detect the relationship between the anomalies by detecting a similarity in characteristics of the anomalies, such as similarities in appearance, shape, orientation, size, position, color, distribution pattern, etc. In some embodiments, the processor can determine a degree of relatedness of the anomalies according to a degree of similarity in the anomalies. For example, the processor may detect that two anomalies both possess the same shape (e.g., an "X" shape). Consequently, because of the similarity in shape, the processor may assign a medium-level rating to the degree of relatedness. Upon further analysis, the processor may further determine that the two anomalies are in a same relative location on back of the cards 807 and 808. For instance, if the only similarity between the two anomalies was being in the same relative location, then the processor could have assigned a low-level rating to the degree of relatedness. However, in response to detecting a similarity in both the shape and the relative locations in the anomalies, the processor determines a greater degree of relatedness than each factor alone, and, thus, may assign a high-level rating to the degree of relatedness.

In some instances, the processor runs (or accesses) a neural network model trained on detecting similarities between features of anomalies in ways that a human cannot detect. For example, to the human eye a mark made on a card may appear to be a minor indentation. Minor indentations may appear on several cards in the network, and may not be easily discernable to the untrained eye. However, a neural network model can determine very small differences in physical marks down to the single-pixel level, and thus can extract features related to objects in ways that a human eye cannot alone do. As a result, the neural network model can determine, from the analysis of the image data of the cards, that the minor indentations have a matching arc shape that maps to a specific fingernail size. Therefore, the processor uses the neural network model to detect the similarities of the minor indentations as a potential card-marking by the same cheating player.

Referring momentarily back to FIG. 7, the flow 700 continues at processing block 708 where an electronic processor relates identities for the first and second participant based on detection of the relationship between the first anomaly and the second anomaly. For example, in FIG. 8, at stage "D" a processor relates player identities in response to the detection of the relationship between the anomalies. For example, the processor detects the identities of the players 841 and 842 in response to analysis of image data of the gaming environment associated with the card games (e.g. by analyzing images of the players in the gaming environment while the card games are being played). The processor can analyze the images of the players 841 and 842 in the gaming as in the aforementioned reference incorporated by reference to US Patent Application Publication No 2020/0098223 to Kelly et al. For example, the cameras 831 and 832 can capture images of the gaming environment, and the processor can utilize computer vision (e.g., application of a neural network model to analyze the image data) to detect, from analysis of the images of the gaming environment, identities of the players 841 and 842. In some instances, a processor (e.g., processor 308) detects the identities of players anonymously, or in other words, the processor tracks (and/or communicates with another device that tracks) unique facial features of an unknown player and assigns a player identity value to the collection of unique facial features that represent the unknown player. The player identity value represents the identity of the player even though the actual identity (e.g., name) of the player remains unknown. Thus, the processor can track the location and activities of the players 841 and 842 anonymously by using the player identity value in place of an actual identity value. The processor can track the location and actions of the players 841 and 842 based on the player identity values (e.g., by evaluation of image data using the computer vision). In some instances, the system 800 is communicatively coupled to a player account server, or any other server or system that includes actual identity values for the players. When the actual identity values are discovered for of any of the players 841 and 842, the processor can associate the player identifier values to the known actual identity values. Furthermore, because players can be tracked anonymously, in some examples the first player 841 and the second player 842 are tracked by the processor as being separate instances of a player generally. In some instances, the player 841 and 842 are different individual people. In other instances, however, the player 841 and 842 may be the same individual person who plays at different tables at different times. Thus, in some embodiments, the processor tracks the anonymous instances of the player 841 and 842 separately, and at some point may identify (e.g., in response to analysis of the image data) that they are the same person cheating at different instances of time using a detectable anomaly. While, in other embodiments, the processor tracks the anonymous instances of the player 841 and 842, and at some point identifies (e.g., in response to analysis of the image date) that they are different people cooperating in secret using detectable anomalies.

In some embodiments, the processor can assign a collusion-confidence score that represents a possible degree of potential collusion between the players 841 and 842. For instance, the processor relates (e.g., in the database 820) the individual player identifiers to a single relationship data value represented by the collusion-confidence score. The data value represents the relationship, and the collusion-confidence score indicates degree or level of suspected collusion. In some instances, the processor adjusts (e.g., weights) the collusion-confidence score according to a degree of relatedness of the first anomaly to the second anomaly. For instance, when the processor detects similarities between the anomalies across different tables, it can apply a data value that represents the degree of similarity between the anomalies to a computation of the collusion-confidence score. Greater degrees of similarity increase the collusion-confidence score. Furthermore, the processor can adjust the collusion-confidence score over time as the processor detects additional related anomalies for any additional card games played (and tracked) using the shuffler network, and as the processor relates those additional related anomalies to player identity values. A higher confidence score indicates a higher possibility that there is collusion between the players to cheat and obtain an unfair advantage by card marking. Furthermore, the processor can adjust the collusion-confidence score based on additional data from the gaming environment that represents possible connection between the players. For example, the processor adjusts the score in response to detection of participation by either the first player or the second player in one or more additional rounds of game play in which has been dealt any one of the first card of high value, the second card of high value, or any card on which is detected either with the first anomaly or the second anomaly. In another example, the processor adjusts the score in response to detection, via analysis of image data of a gaming environment, of any one or more of physical contact between the players, communication between the players, commonality of physical location of the players (and/or their personal devices, such as their smart phones), etc. In some examples, the processor adjusts the score in response to detecting similarities in behaviors between the players (e.g., ordering the same type of drink, playing similar game strategies, making similar bets, etc.).

Figure 9:
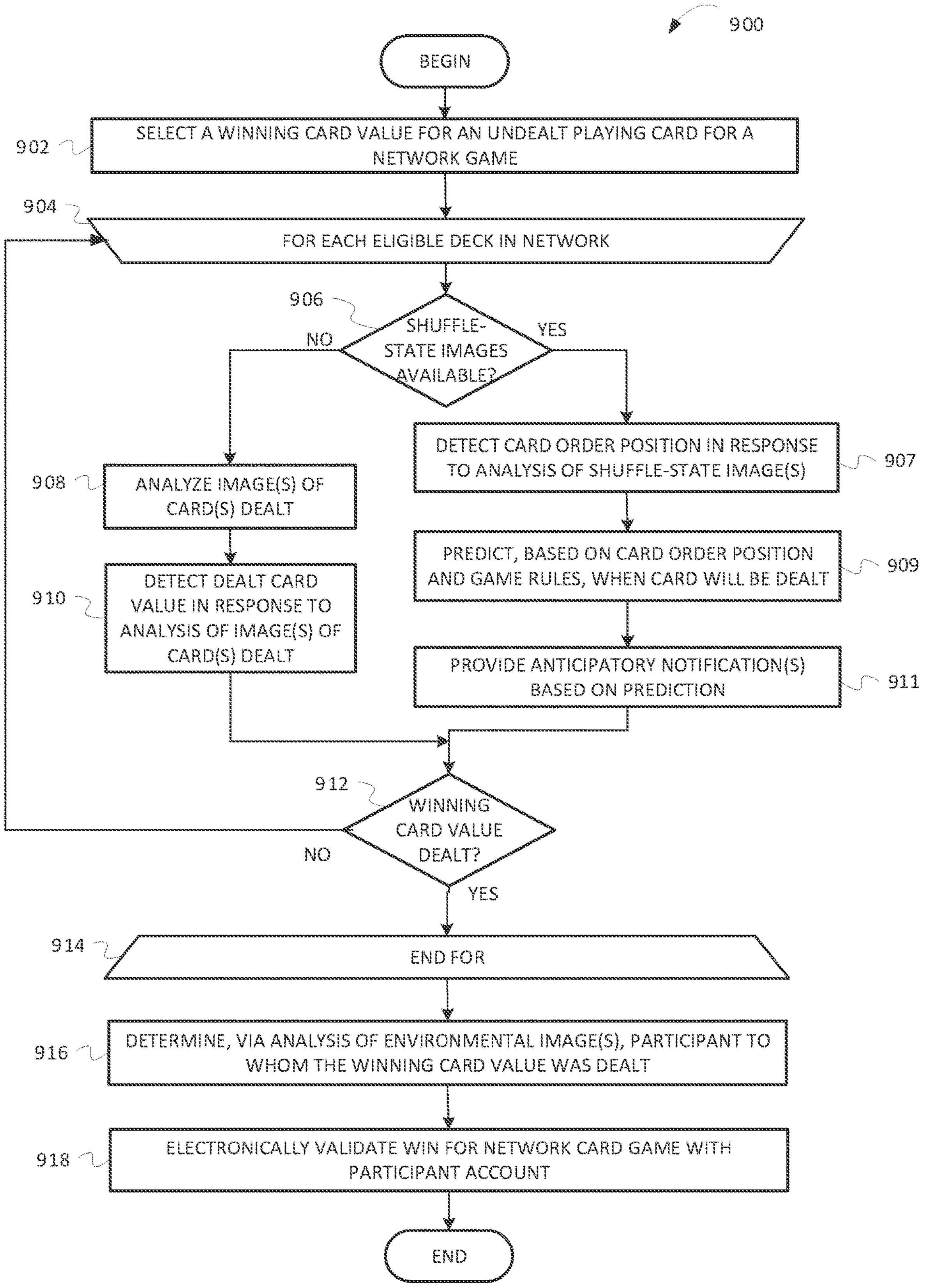
FIG. 9 is a flow diagram of administering a network game using a networked gaming device system in accordance with at least one embodiment
Figure 10:
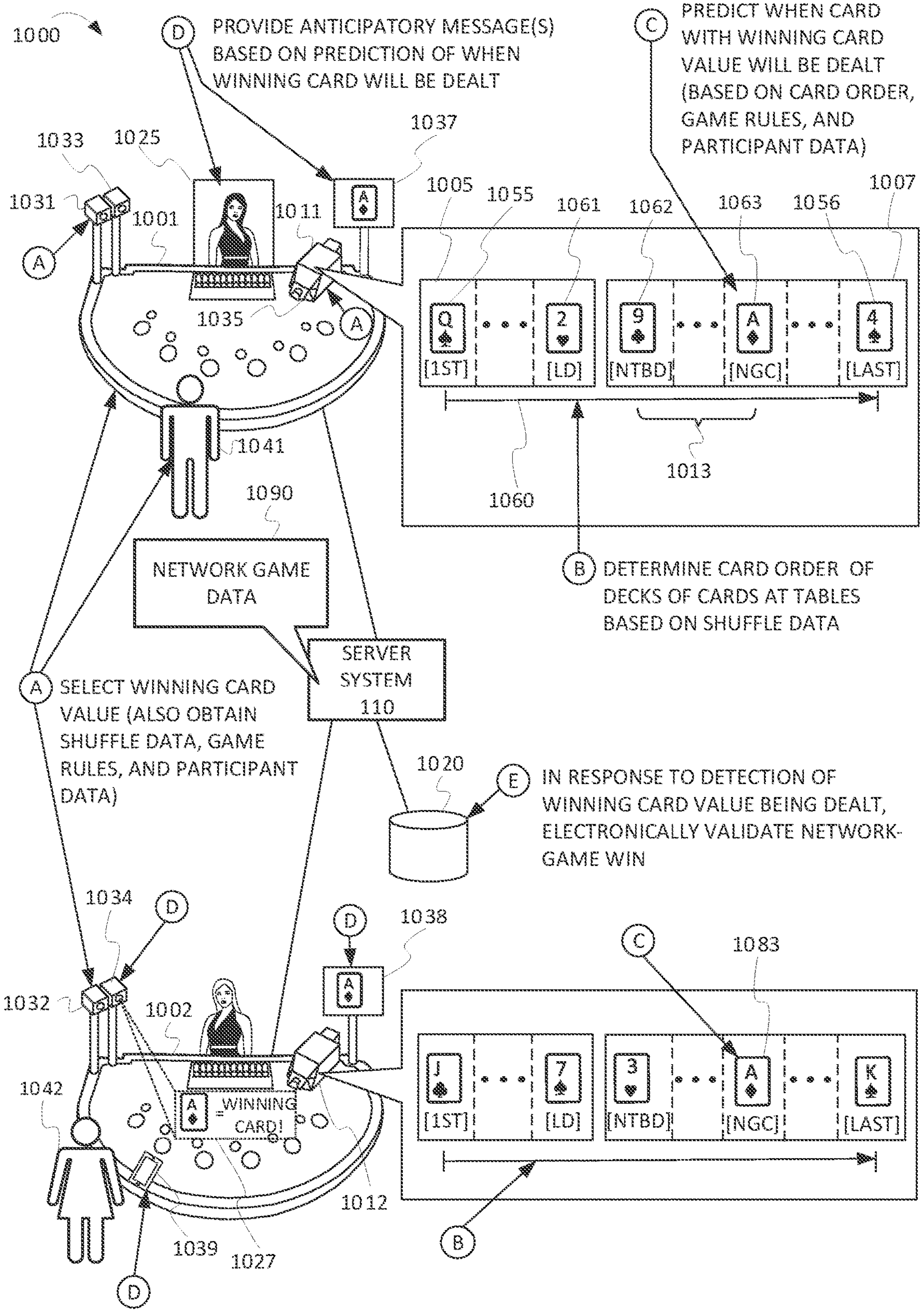
FIG. 10 is a diagram of administering a network game using a networked gaming device system in accordance with at least one embodiment.

FIG. 9 is a flow diagram of an example method for administering a network game using a networked gaming device system in accordance with at least one embodiment. Casinos have a strong interest in tracking information for games that span a network of gaming devices, such as a network of gaming tables having networked shuffler devices. FIG. 10 illustrates an example according to the flow 900 and will be described separately in connection with FIG. 9.

In FIG. 9, a flow 900 begins at processing block 902 where an electronic processor selects a winning card value for an undealt playing card for a network game. In some examples, selecting a winning card value involves selecting at least one (optionally more) of the card values from a standard deck of playing cards (e.g., the processor selects at least one of the fifty-two card values in the standard deck to be a winning card value for the network game). In one example, as in FIG. 10, several stages of activity are illustrated. At stage "A," a processor (e.g., a game controller) selects a winning card value for the network game. For instance, a game controller for the network game selects, as the winning card value for the network game, the Ace of diamonds. The game controller further obtains any shuffle data (if available) as well as any game rules and participant data available for any given table.

Figure 11:
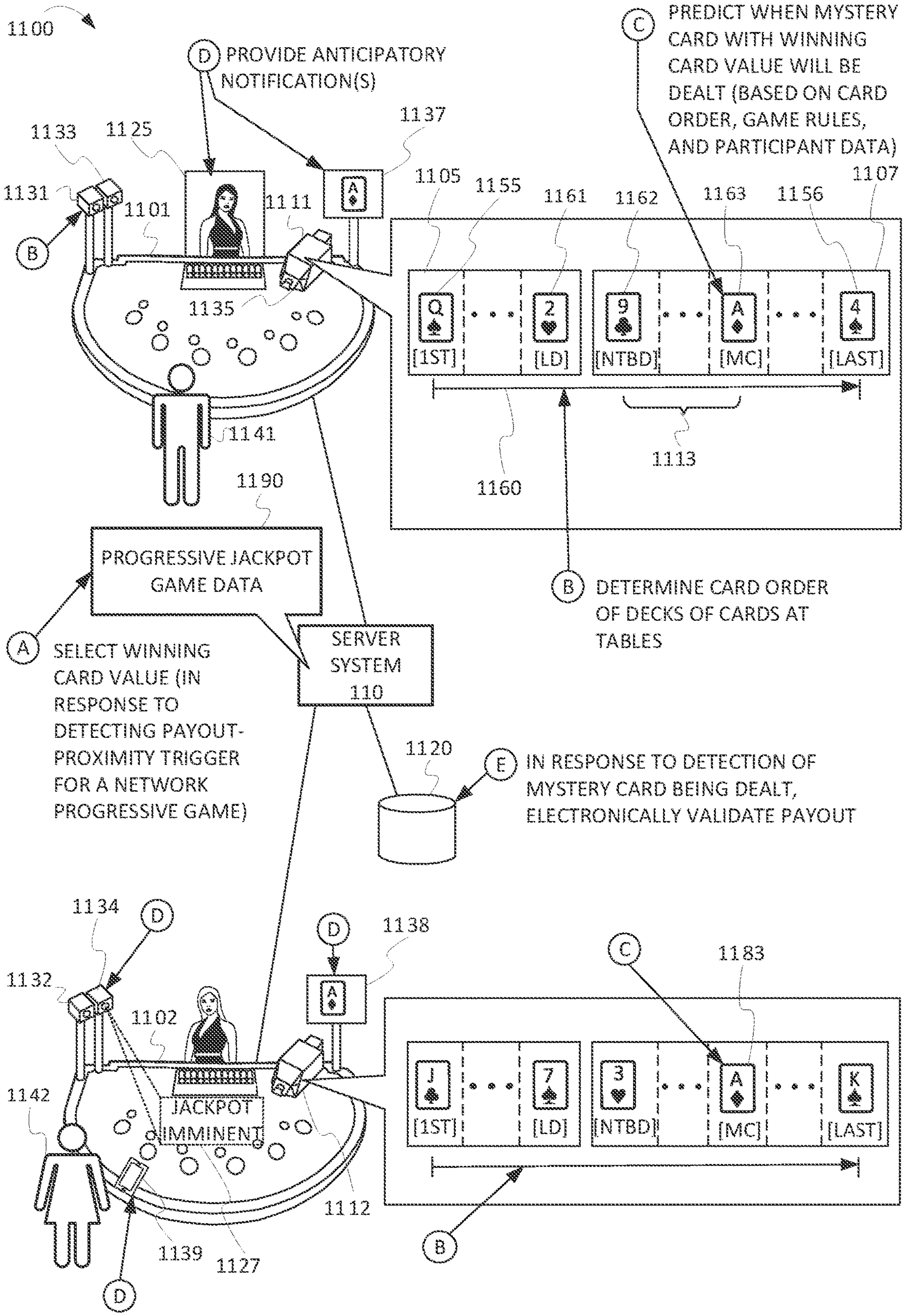
FIG. 11 is a diagram of administering a network game using a networked gaming device system in accordance with at least one embodiment.

The description of FIG. 10 (as well as the description of other embodiments herein, such as FIG. 11) refers to a "game controller" which may, for instance, be the processor in the server system 110. The game controller may instead be, and/or utilize one or more of, other processors in the system 1000 (e.g., processor 208 of device controller 202, processor 308 of table controller 304, a processor for server computing device 114, a processor for a sensor inside of a device, a processor for a display, a processor for a personal mobile device or smartphone, any combination of processors, etc.). For the purposes of FIG. 10, the game controller may be assumed to be a processor in the server system 110 and which utilizes the processors of other devices in the system 1000 via communication on the network(s). The game controller tracks information about the system 1000 and the gaming environment and uses the information. The information may include, but is not limited to, times that certain activities occurred (e.g., play actions, betting, conversations, card touches, etc.), information about the tables 1001 and 1002 (e.g., table identifiers), information about the shuffler devices 1011 and 1012 (e.g., shuffler identifiers, shuffle times, shuffle states, etc.), information about a gaming environment (e.g., information about the rounds of play, the players, chips, bet amounts, etc.), and so forth.

Furthermore, FIG. 10 illustrates a system 1000 that includes networked gaming devices similar to any other system described herein, such as system 100 or system 800. For example, the system 1000 includes a plurality of gaming tables (1001, 1002) connected via a network of movable gaming devices, such as a network of movable card-handling devices, including shuffler devices 1011 and 1012. The system 1000 may also include other devices, such as card sorting and dispensing devices (e.g., shoes) that receive a deck of shuffled cards (e.g., by hand or directly from a shuffler) and which dispense the shuffled cards. The shuffler devices 1011 and 1012 illustrate examples of shufflers that incorporate shoes (e.g., shoe 1035).

The system 1000 may further include a database 1020 used to store and track data, such as indicators (e.g., timestamps, descriptions, etc.) of events related to (or relevant to) the network game, such as events that occur at or near the gaming tables 1001 and 1002, events that occur via the shuffler devices 1011 and 1012, events that occur via gaming devices, events that occur via personal user devices, events broadcast from the server system 110, etc. In one example, the database 1020 is similar to the database 116 illustrated in FIG. 2 or the database 820 described in FIG. 8.

The system 1000 further includes sensors that track activities and information in a gaming environment (e.g., an area at, or around, a gaming table, including the surface of the gaming table, props or devices used at the table, player positions at the gaming table, players seated at a table, back betters, casino staff, etc.). One example of sensors that track the gaming environment include cameras 1031 and 1032. The cameras 1031 and 1032 (or other sensors) may be those associated with a gaming system according to the disclosure of, for instance, in the aforementioned US Patent Application Publication No 2020/0098223 (Kelly et al.).

The system 1000 also includes output devices, such as projectors 1033 and 1034 (e.g., to project content, such as the message 1027), displays 1037 and 1038 (e.g., to show information about the network game, such as a winning card value or an anticipatory message), a virtual dealer 1025 (e.g., to provide verbal notifications), speakers, personal devices (e.g., personal mobile device 1039), etc.

Furthermore, in some embodiments, at processing block 902, the processor selects a winning card based on historic betting information. For example, there may be multiple gaming tables on a casino floor contributing a certain percentage of bets to a collection pot for a network game payout. A subset of those tables may contribute more than others. Consequently, in some embodiments, the processor may select a winning card from a set of undealt cards that are related to one or more of the subset of those tables that historically are betting more (e.g., and thus contributing more) to the pot.

Referring momentarily back to FIG. 9, the flow 900 continues at processing block 904 where, in response to selecting the winning card value for the network game, the electronic processor begins a loop that, for each eligible deck in the network, performs one or more operations until the loop ends at processing block 914. For instance, the network game is eligible for play at any electronic gaming table within a given casino and/or within a given area encompassing a valid gaming network (e.g., across multiple locations or casinos). For each of the eligible tables, there is a deck of playing cards being used for the individual games played at the gaming tables. Each of the individual games may be of different types or of the same type of game. The rules for the network card game may, in some instances, be for the same type of game (e.g., games with the same or similar playing rules, games with the same or similar card distribution rules, games with some similar winning card values, etc.). A shuffler can store, in a memory, a listing of different game types and different rule sets for each game type. The shuffler can communicate with other devices at the gaming table, such as a shoe, a display device, an automatic card dispenser, a local player station, a player tracking system, etc. Furthermore, the shuffler can provide data locally at the gaming-table level (e.g., via the first communication network 106 described in FIG. 1) regarding any game rules for any of the different game types at the gaming tables. Each of the different game types may have some difference in their individual rules for the particular card game played at the table. The network card game, has its own rule set such as rules regarding the selection of the winning card value, rules regarding player or table eligibility (e.g., rules about minimum-bet amounts), etc. The network card game can also utilize some rules of the individual games. For example, the network card game may require that the player perform a given activity during a given type of game based on the rules of the individual game. For example, the game controller for the network game may require that a player must bet twice within a betting round. Thus, for games like poker or blackjack, either game has rules where a player can bet more than once during a given round of play. For example, a player at a poker table may make an ante bet and make one or more additional raise bets during a round of play. A player at a Blackjack table can make more than one bet by placing a first bet on an initial two-card hand, then perform a second bet by doubling-down and/or splitting a pair and making an additional bet on the split pair. Thus, the game controller can require a generic type of rule that utilizes some, but not all, of the rules of the individual games as part of the rules and/or functionality of the network game. The game controller can utilize multiple different types of rules from the individual games at each table, such as a rule of play, a rule of betting, a rule of card dispensing, a payout rule, a pay table, etc. In other, embodiments, however, the game controller does not utilize any rules from the individual card game, rather may track only whether or not a card was dealt during any of the games at the gaming tables while the network game is in play.

Referring momentarily back to FIG. 9, the flow 900 continues, at processing block 906, where the processor determines whether there are shuffle-state images available for the eligible card decks. If there are shuffle-state images available for the decks of cards at the gaming tables, the processor can predict when a card will appear at any of the given tables before the card is dealt (i.e., the branch of the for loop that includes processing blocks 907, 909, and 911, or the "predictive" branch). If, however, there are no shuffle-state images available for a deck of cards (or where the shuffle-state images cannot be made available for some, or all, of the eligible tables), then the processor analyzes images of the dealt cards after being recorded and determines, based on analysis of the recorded images, the value of a card being dealt at any given gaming table (i.e., the branch of the for loop that includes processing blocks 908 and 910, or the "responsive" branch).

For instance, regarding the responsive branch, the flow 900 continues at processing block 908 where the processor analyzes one or more images of cards dealt. In some instances, the processor obtains a captured image(s) from a camera attached to a shoe at any of the gaming tables. The image may be taken when the card is distributed from the shoe. In other instances, the processor obtains a captured image(s) from a camera positioned at the gaming table (e.g., a camera, attached to the gaming table, which records images of the gaming environment at or around the gaming table). The camera, or cameras, have a viewing perspective of the portions of the gaming table where cards are dealt and revealed. The camera(s) can capture images of the cards and process the images for analysis by a machine learning model (e.g., the processor can crop the images and provide the cropped image to a relevant machine learning model to analyze).

The flow 900 then continues at processing block 910 where the processor detects a card value in response to analysis of one or more images of the dealt card(s). For example, a machine learning model (e.g., a neural network model) analyzes the number of suit pip symbols on a card, a shape of suit symbols, a shape and relative location of number values, etc. Based on the analysis, the neural network model determines the value of the card within a given accuracy range. The aforementioned US Patent Application Publication No 2020/0098223 (Kelly et al.) describes some examples of utilizing a trained machine learning model (e.g., a neural network model) to identify card values.

At processing block 912, the processor determines whether the card was physically dealt and revealed. For example, at processing block 912, the processor compares the detected card value of the dealt card (detected from processing block 910), to the value for the selected winning card value (selected at processing block 902) to determine whether there is a match between the detected card value of the dealt card and the winning card value. If so, then the loop ends at processing block 914. If a card with the winning card value has not been physically dealt yet, then the loop returns to processing block 904. In some instances, where it has already been determined whether the shuffle-state images are not available (e.g., the loop has already gone through a first iteration), the processor can simply refer to a stored value that represents the outcome of processing block 906 and, thus, does not have to process or assess any additional information other than to check the value previously determined at processing block 906 for the first iteration of the loop. In some instances, the processing block 906 may instead be outside of the loop (e.g., between processing block 902 and 904). In some examples, the loop repeats, in parallel, for each given table on the network.

Referring still to FIG. 9, if there are shuffle-state images available for the shuffled card decks at the gaming tables, then the processor performs the operations associated with the predictive branch. For example, if shuffle-state images are available, the flow 900 continues at processing block 907, where the processor detects a card order position in response to analysis of the shuffle-state images. For example, in FIG. 10, at stage "B," the game controller determines, based on analysis of shuffle-state image data of a plurality of shufflers, a card order for each deck of cards. In some examples, the gaming system obtains a set of images of every individual card from the deck of cards at each table. The set of images are captured by one or more sensors of an automated shuffler device (such as shuffler device 1011) as the shuffler device organizes each individual card into a shuffled card order 1060 for the entire deck. The shuffled card order 1060 occurs according to a random number generated by the shuffler device 1011 when the shuffler device 1011 shuffles the cards. The shuffled card order 1060 includes a sequential-position value for each card in the deck. For example, a first card 1005 occupies a first sequential position (i.e., a [$1^{ST}$] position in the shuffled card order 1060) and a last card 1056 occupies a last sequential position (i.e., the [LAST] position). In one example, the game controller can obtain the images by capturing the images directly via one or more sensors inside of an automated shuffler or from retrieving the images from an image store. In some embodiments, the images may be captured in response to detecting a network event (e.g., the network card game is started, a point of sufficient funding is reached for the network card game payout, a player has made an eligible bet, etc.). In some embodiments, the game controller can begin capturing the images from the shuffler devices (811 and 1012) with enough time to collect the order of cards for all decks at all tables (including any shuffled decks used as backups) before beginning a selection process for the winning card value. In some embodiments, the game controller identifies, via a machine learning model (e.g., a neural network model), a face value of each individual card from each set of images. In response to identifying the face values, the game controller assigns a sequential-position value to the face value for each card in each of the of decks of cards. The sequential-position value matches the sequence order in which the card was placed within the shuffled deck when the shuffler device organized each individual card into the randomized, shuffled card order 1060 during shuffling.

In some embodiments, the images of the shuffled cards may be captured in response to detecting a network event. In some embodiments, the network event occurs with enough time before for the game controller to have time to broadcast an electronic task to all shufflers on the shuffler network to begin capturing images of the shuffled cards at the eligible gaming tables. In some embodiments, the game controller can begin capturing the images with enough time to collect the order of cards for all decks at all tables (including any shuffled decks used as backups) before selecting the winning card value. The winning card value corresponds to one or more undealt cards of the same value in the decks of cards at the eligible gaming tables. For example, the selected winning card value was the Ace of Diamonds. The Ace of Diamonds corresponds to card 1063 from the deck at gaming table 1001, as well as to card 1083 from the deck at gaming table 1002. The cards with the winning card values may be referred to more succinctly herein as "network game cards" or NGC.

Returning momentarily to FIG. 9, if there are shuffle-state images available for the shuffled card decks at the gaming tables, then the processor performs the operations associated with the predictive branch. For example, if shuffle-state images are available, the flow 900 continues at processing block 907, where the processor detects a card order position in response to analysis of the shuffle-state images. For example, in FIG. 10, at stage "C," the game controller determines, in response to determining the card order, that the network game card will be dealt from an undealt subset of one of the deck of cards at one of the gaming tables for a subsequent game play round. In some embodiments, the game controller determines that the network-game card will be dealt based at least on the shuffled card order 1060 and one or more rules associated with each wagering game presented at each of the gaming tables, such as card distribution rules for the individual wagering game. For example, the game controller determines a sequential-position value of a top card 1062 of an undealt portion of each of the deck of cards at the gaming tables. In some embodiments the game controller selects the specific winning card value (or combination of specific card values) in response to detecting a network event. As mentioned, any card having the winning card value may be referred to as the network-game card and its appearance during a playing round indicates that at least one player at the gaming table (e.g., a specific player at the gaming table) wins the network card game. By knowing the top card 1062 of the undealt portion of a deck of cards, then the game controller keeps track of a first subset of the deck of cards that has been dealt (e.g., dealt subset 1005) and a second subset of the deck of cards that has not been dealt yet (e.g., undealt subset 1007). The system can then select, from the undealt subset 1007, the card value that corresponds to the card 1063.

The game controller can determine the sequential-position value of the top card 1062 in various ways. For example, the game controller can directly capture the images via one or more sensors inside of an automated shuffler, such as shuffler devices 1011 and 1012. In another example, the game controller can retrieve and analyze a set of images for the shuffle state from an image store (e.g., stored within a memory associated with the shufflers 1011 or 1012, in a memory stored at the respective gaming tables 1001 and 1002, in the database 1020). Further, in some embodiments, the game controller can count a number of cards already dealt and compare the count to the shuffled card order 1060. For example, the game controller can determine a number of cards that have been dealt based on analysis of image data, weight, etc. taken from sensors in the environment around a gaming table, such as image sensors and/or scales positioned at a card discard pile or discard bin for already dealt cards. The discarded cards comprise the dealt subset 1005. The game controller can then access a specific image having a sequential-position value that corresponds to the number of cards already dealt plus one. The specific image of that card represents the card at the top of the undealt portion of the deck of cards according to the card order, or, in other words, the card 1062. In other words, the card 1062 occupies a sequential-order value, from the shuffled card order 1060, which represents next card to be dealt from the undealt subset 1007 (i.e., the next-to-be-dealt position, or [NTBD]). In other words, the card 1062 is at the top of the undealt portion of the deck of cards at the gaming table 1001.

As mentioned, the game controller can also determine the sequential-position value of the card 1062 from direct analysis of previously captured images. For example, the game controller can determine, based on analysis of an image captured from a sensor in a card shoe (e.g., card shoe 1035), a face value of the last card dealt 1061. The game controller can then access and analyze a set of images of a shuffled order for the deck of cards. The game controller determines a sequence position in the shuffled card order 1060 that corresponds to the face value of the last card dealt (i.e., the [LD] position). The game controller then selects, as the sequential-position value of the top card 1062, the next sequential position in the card order after the [LD] position, which corresponds to the [NTBD] (e.g., card 1062).

In some embodiments, the game controller can communicate with the shoe 1035. In some instances, the shoe 1035 tracks each face value of each card as it is dispensed and also keeps a running count of the sequential-position value for each card as it is dispensed. The game controller can thus query the shoe 1035 for that information. In some instances, the shoe 1035 also communicates with the shuffler device 1011 and may store information about the dispensed cards in a memory associated with the shuffler device 1011. The shuffler device 1011 can use that information to keep a record of the dealt subset 1005 and the undealt subset 1007 as each card is dispensed. Thus, in some embodiments, the game controller can query the shuffler device 1011 regarding only the undealt subset 1007. For example, if the game controller is on the server system 110, then the server system queries the shuffler device 1011 for a sequential card order of only the undealt subset 1007. In other words, the shuffler device 1011 may track the shuffled card order 1060 and determine the value of the last card dealt 1061 to keep track of the undealt subset 1007. The shuffler device 1011 can, after analysis of the images of the cards that were shuffled, provide a summary report indicating the shuffled card order 1060 and a sequential-position value and face value for each card (as opposed to sending the server system 110 image data to analyze, so that the server system 110 does not have analyze each set of images). In other words, in one embodiment, if the shuffler device 1011 performs the image analysis in real time, tracks the shuffled order 1060 and also tracks the undealt subset 1007, then the game controller only needs to know about the undealt subset 1007 and can receive the data it needs to perform analysis of a relative position of the card 1063 within the undealt subset 1007. In some embodiments, the shuffler device 1011 can perform the analysis of the relative positions based on a transmission by the server system 110 for a sequential-position value of the card 1063 directly in relationship to sequential-position value of the card 1062.

Returning momentarily to FIG. 9, the flow 900 continues at processing block 909, where the processor predicts, based on the card order position and game rules, when a card will be dealt. For example, in FIG. 10, the game controller can determine when the card 1063 will be dealt based on a minimum number of cards to be dealt for the given playing round. In some instances, the minimum number may be based on an assumption that at least one player is participating in the wagering game at the gaming table 1001. In other embodiments, however, the game controller can more accurately determine the minimum number of cards to be dealt in response to determining a number of participants at the gaming table 1001. In one example, the game controller determines the number of participants based on participant activity captured via one or more sensors in the gaming environment, such as cameras 1031 and 1032. In some embodiments, the game controller determines the participant activity in response to analysis of environmental image data of one or more of placement of a bet or performance of a game-play action at the gaming tables. The previously mentioned US Patent Application Publication No 2020/0098223 (Martins et al.) describe a system and method for analyzing environmental image data, via one or more machine learning models (e.g., neural network models), to determine identities and actions of players. The aforementioned US Patent Application Publication No 2020/0098223 (Kelly et al.) describes a system and method for analyzing environmental image data, via one or more machine learning models (e.g., neural network models), to determine identities and values related to players, cards, and gaming chips (e.g., identifying values of bets from analysis of images of chip stacks placed on a gaming table).

Based on the determined player activity, the game controller determines a number of players that participate (e.g., that place, or have placed, a qualifying bet). In some examples, instead of just a bet alone being the triggering event, the game controller can detect actual bet amounts to determine whether network-game contribution amounts will go over a trigger value. In some instances, the game controller can require that an additional triggering event be performed as part a game process and/or during game play (e.g., the game controller may require that specific card value appear and also a game participant must have done something in addition to betting for the current round, such as they may need to have split a bet). Furthermore, in addition to determining the number of players, the game controller determines, according to game play rules for each game at each table, a minimum number of cards that each of the number of players should be initially dealt at the beginning of each game play round game. The game controller can query the shuffler devices 1011 and/or 1012 and/or the gaming tables 1001 and/or 1002, for information, such as game settings and game rules, for any game being played (e.g., as described in FIG. 6). The game controller multiplies the number of players by the minimum number of cards to be dealt per player to determine a minimum number of cards to be dealt during the playing round in a subsequent playing round. The game controller then evaluates, based on the number of cards to be dealt, a sequential-position value for the card 1063 against the sequential-position value of the top card 1062 (i.e., game controller evaluates the [MC] sequential-order value against the [NTBD] sequential-order value). For instance, the game controller can count a number of sequential position values (count 1013) from the first sequential-position value (i.e., [NTBD]) to the second sequential-position value (i.e., [MC]). If the minimum number of cards to be dealt during the playing round is more than or equal to the count 1013, then the card 1063 is certain to be dealt in the next upcoming playing round for that particular deck of cards.

In one example, such as in the case of Texas Hold 'Em Poker, or variations thereof, a community hand and a player hand are dealt. For instance, three to five cards are dealt as community cards during a round of play, two hole cards are dealt as a player hand to each participating player, thus a minimum of seven cards would be dealt at a table with two participants (e.g., four hole cards dealt (i.e., two for each participant)+three initial community cards on the flop=seven cards initially dealt). Thus, in the case of two game participants, if the position of the card 1063 is within seven cards of the top card 1062, then the game controller can accurately predict that the card 1063 will appear within one playing round. In another example, in a game of Blackjack, at least 2 cards will be dealt for each participating player (e.g., two cards are initially dealt for each player's hand and 2 cards are dealt for the dealer hand). If more than one player is betting during the round, then an additional 2 cards would be considered to be dealt for each additional player as initial card hands. Thus, for a game of Blackjack with at least one player and the dealer, then at least 4 cards would be dealt during an initial deal of the playing round. For instance, in an scenario where the gaming table 1001 presents a Blackjack game, if the position of the card 1063 is within four cards of the card 1062 of an undealt portion of a deck, then the game controller can accurately predict that the card 1063 will appear within one playing round.

If the minimum number of cards to be dealt is less than the count 1013, then the game controller can track as the cards are being dealt in real time to estimate whether the card 1063 may still possibly be dealt in the current playing round or whether the card 1063 will be dealt in a subsequent playing round. For example, in the case of Texas Hold 'Em, after the flop an additional 2 community cards may be dealt (e.g., if the playing round continues after the flop to the dealing of the "turn" or the "river" cards). In the case of Blackjack, many additional cards beyond an initial deal may be dealt from the deck during the playing round (e.g., additional "hit" cards dealt to the player or to the dealer). Thus, in some instances, the game controller estimates when the card 1063 will be dealt based on a range of possible cards to be dealt. For example, in the case of standard Texas Hold 'Em, a predicted minimum number of dealt cards for any given subsequent playing round is equivalent to the number of players participating times two (for each respective initial hand), plus three cards for the flop (i.e., minimum predicted cards dealt for Texas Hold 'Em round=(number of players)×(two initial cards per player)+(three additional cards for flop)). A predicted upper limit for the range of possible cards dealt may include the computation for the minimum value plus two additional cards for the turn and the river and any additional burned cards (e.g., if a dealer is required to burn cards, then those number of required burned cards are added to the possible upper limit). For Blackjack, a minimum predicted cards dealt includes the number of players participating (including the dealer), times two (for each respective initial hand). An upper limit for the range of possible cards dealt may include a maximum number of cards allowed to be dealt per player. For example, according to some game rules for Blackjack, if a player is dealt 7 cards and still does not bust, then the player may be considered an automatic winner. Thus, the game controller can determine that a minimum number of cards dealt for any given hand may be between two cards (i.e., the minimum required to be dealt) and seven cards (i.e., the maximum required for an automatic win). In other circumstances, such as in a game where there is no rule regarding a maximum amount of cards to be dealt, the game controller may estimate that no given Blackjack hand could be more than 10 cards in total without busting (e.g., four "Aces"+four "Twos"+three "Threes"=eleven cards). Thus, the game controller may utilize a range of cards to be dealt to be between two cards (i.e., the minimum required to be dealt) to eleven cards for any given hand. If the sequential-position value for the card 1063 is within the minimum number of cards required to be dealt, then the game controller can estimate that the card will appear in the current playing round. If the sequential-position value for the card 1063 is beyond the minimum number, yet still within the upper limit, then the game controller can estimate (based on the number of cards to be dealt beyond the minimum) whether that the card will possibly appear in the current playing round, or whether it will appear in a subsequent playing round after the current playing round. If the sequential-order value for the card 1063 is beyond the upper limit, then the game controller estimates (i.e., forecasts) that the card will be dealt in a subsequent playing round (not in the current playing round).

In the case of splitting, the game controller can further detect whether a split would be possible given the card order of the undealt set of cards. For example, splitting may be done when a pair of cards (with matching rank values) is dealt for a player's initial hand. The game controller can analyze the undealt card order and determine whether there are any cards of matching rank value within the undealt portion. Furthermore, the game controller can determine whether it is possible for any of those matching cards to be dealt to the same playing hand. For example, at a table with more than one player, if the cards are dealt at the table consecutively (e.g., if the dealer/card dispenser deals the two initial cards consecutively to each player hand), then the game controller can determine, from the card shuffled-card order 1060 and from the known method of distributing the cards, that two cards of the same rank positioned consecutively next to each other in the order of the undealt subset have a chance of being dealt as a pair that could be split. In another example, if the cards are dealt in a round (e.g., if the dealer deals the first card (of each initial two-card hand) to each player in turn before dealing the second card to each player), then the game controller can determine that a same player could be dealt two cards of the same rank, if the two cards are positioned far enough away from each other in the deck order such that the dealer/card dispensing controller would deal the two cards based on the number of players to whom cards must be dealt. For example, if the dealer dealers the initial cards in a round, and if there are two matching card ranks in the undealt portion (e.g., two "8's"), the game controller uses the number of game participants as a reference value as to whether the round of dealing would land back on the same player. For instance, if there are four participants receiving cards, and if the two 8's are four sequential-position values apart from each other, then the game controller determines that the matching card pair (i.e., both 8's) would be dealt to the same player, thus being eligible for a split. The game controller can, thus, update the upper limit of possible cards to be dealt during the current playing round. The game controller can utilize the same technique of determining whether two of the same card would be dealt to the same person as for determining whether any two cards would be dealt in the same round to the same player. Thus, the system can determine whether not only one card is dealt to the same player, but also whether two or more cards (of any given required face values) would be dealt to the same player.

In some embodiments, the game controller may forecast a number of subsequent rounds before the card will be dealt using a recent history of playing activity. For example, the game controller may determine that a given gaming table has had two players playing at it regularly for a short amount of time (e.g., fifteen minutes). As a result, the game controller may predict that those two players may be at the table, and will continue to make consistent bets for an additional period of time (e.g., an additional 15 minutes), according to historic play patterns of the players, common statistical playing times for players, betting patterns given an initial buy-in, betting patterns given minimum bet values, detected chip amounts at a table, etc. The game controller may further take into consideration a time of day, a time or year, or other possible factors that may cause an increase or decrease to the level of play. Given all of the information available to it, the game controller may determine (e.g., forecast), that a range of cards may be dealt (e.g., between the minimum required to be dealt and the estimated upper limit) for each of the tables given the number of cards left in each undealt portion of the deck. As events occur in real time (e.g., as the game controller detects players leaving or joining tables in real time), the game controller updates the forecast. Forecasting, thus, may become more accurate the closer the card 1063 comes to being dealt (e.g., as the card 1063 rises to the top of the undealt portion of the deck).

The game controller can perform operations related to the card 1063 for the table 1001 concurrently with performing similar operations related to an additional card 1083 for the table 1002. In some examples, the game controller may detect that the winning card value appears at different tables (such as the example shown in FIG. 10, where the card 1063 and the card 1083 of an equivalent face value are both in undealt subsets). In one embodiment, the game controller can split the payout amongst multiple players that were dealt the equivalent card during the same playing rounds. In other embodiments, the game controller may award the payout to the player who first placed a bet during the respective playing rounds. In yet another instance, the game controller may award the payout to the player that placed the bet that caused a pool to reach the payout threshold value (e.g. see FIG. 11). In some embodiments, if the game controller detects that any of the cards have already been dealt out at a table (e.g., if the card is sitting in a discard pile), then the system excludes that table from the prediction as to whether the network game card will be dealt to that table.

In some embodiments, the game controller may require that a network game card be dealt to a specific player (e.g, to a player that placed a bet that triggers a network game event). To do so, the game controller may select multiple cards from the undealt deck as possible cards to deal during the playing round. After all of the initial bets are placed, the game controller can determine which card value will be dealt to which player so long as the dealer (or dealer device) deals the cards according to a predictable pattern. Thus, the game controller can select, as the winning card value, a value of one of the cards that will be dealt to the player.

Returning momentarily to FIG. 9, the flow 900 continues at processing block 911, where the processor provides one or more anticipatory notifications based on the prediction. For example, in FIG. 10 at stage "D," a game controller provides an anticipatory indicator in response to determination that the network game card will be dealt. For example, the game controller can transmit a message to the one or more output devices associated with the plurality of gaming tables 1001 and 1002. The message may indicate the value for the selected network-game card. In some embodiments, the message is a "build-up" to the reveal of the winning card value that coincides with the payout for the network game. For example, the game controller can present an anticipatory message via a virtual dealer 1025, via a message 1027 projected onto the gaming table 1002 via projector 1034, via a message presented on the displays 1037 or 1038, via a message presented from speakers at the gaming tables 1001 and 1002, via environmental lighting at or surrounding a table, or in any other way. In some embodiments, the game controller transmits one or more anticipatory messages to devices associated with an individual game participant (e.g., augmented reality glasses or headsets, a personal mobile device 1039, etc.). In some embodiments, the game controller detects a mobile device identifier associated with a player account. The game controller can broadcast the anticipatory indicator to the mobile device using the mobile device identifier. In some embodiments, the game controller provides one or more anticipatory notifications to security systems, backend servers, administrative controllers, casino floor staff, etc. For instance, the game controller can transmit an anticipatory notification to a security system to automatically activate security cameras in anticipation of the relevant cards being dealt and in anticipation of revealing a winner.

Referring momentarily back to FIG. 9, after following the predictive branch, the flow 900 continues, at processing block 912 where a processor determines whether the network game card (i.e., with the winning card value) was dealt. In some instances, determining whether the network game card was dealt may involve inspecting a card after it is revealed to determine its card value. In some instances, the processor determines whether the network game card was dealt by analyzing images of the cards after they are dealt. Consequently, in some instances, after following the predictive branch, the processor may follow the operations specified from processing blocks 908 and 910 to detect the card value of any given card that was dealt at a gaming table. Thus, at processing block 912, the processor can, as described previously, determine whether the detected card value matches that of the winning card value for the network game.

Returning momentarily to FIG. 9, the flow 900 continues at processing block 916 where a processor determines, via analysis of one or more environmental images, a participant to whom the network game card was dealt. Then, at processing block 918, the processor electronically validates a win for the worked card game with a participant account. For example, referring back to FIG. 10, at stage "E," a game controller electronically validates that the network game card was dealt. For instance, the game controller can analyze image data associated with one of the plurality of gaming tables at which the network game card was dealt. The game controller can detect, via one or more machine learning models (e.g., neural network model(s)), which cards are dealt at the gaming tables. For example, the cameras 1031 and/or 1032 capture images of the participants (e.g., players 1041 and 1042) at the gaming tables 1001 and 1002. The game controller can also analyze the images to detect face values of cards that are dealt at the gaming tables 1001 and 1002 to the various participants at various times. The game controller can utilize one or neural network models that have been trained to identify dealt cards and to identify features of the different face card values from the dealt cards.

In response to detecting that card was dealt, the game controller can make a notation of a payout to a player and/or to a known player account for the player. The game controller can further make a note of the payout to other accounts and/or entities, such as to a casino accounting department, a casino security group, etc. For example, the game controller can combine all of the details of events into a report of the win showing timestamps, video clips, security video, trigger details, funding data, neural network analysis data, player's activity (e.g., bets made, bet amounts, gestures related to play, etc.) details about the hand that won, details about the dealer's activities, details about the shuffled states of the decks of cards at the tables, card orders of decks during playing rounds, details about cards that are revealed, details about cards discarded (e.g., discard bin weight, discard bin video, etc.), identity of players at the gaming table, jackpot payout data, account linking data, image data (e.g., video of the table, video of the players and dealer, video of back-betters, images of cards dealt, images of cards shuffled, etc.) environmental data, sensor data, game data, table statistics data, dealer statistics data, and/or any other relevant information. The system can store the details as data in one more memory locations (e.g., on the shuffler devices 1011 and 1012, at the gaming tables 1001 and 1002, in player accounts, in casino accounts, in databases, at servers, etc.).

FIG. 11. is a diagram of administering a network game using a networked gaming device system in accordance with at least one embodiment. FIG. 11 illustrates an example of a network card game described more generally in FIG. 9, however the network game described in FIG. 11 is a progressive jackpot game. As shown in FIG. 11, a system 1100 of networked gaming devices similar to any other system described herein, such as system 100 or system 700. For example, the system 1100 includes a plurality of gaming tables (801, 1102) connected via a network of movable gaming devices, such as a network of movable card-handling devices, including shuffler devices 1111 and 1112. The system 1100 may also include other devices, such as card sorting and dispensing devices (e.g., shoes) that receive a deck of shuffled cards (e.g., by hand or directly from a shuffler) and which dispense the shuffled cards. The shuffler devices 1111 and 1112 illustrate examples of shufflers that incorporate shoes (e.g., shoe 1135).

The system 1100 may further include a database 1120 used to store and track data, such as indicators (e.g., timestamps, descriptions, etc.) of events related to a progressive jackpot game, such as events that occur at or near the gaming tables 1101 and 1102, events that occur via the shuffler devices 1111 and 1112, events that occur via gaming devices, events that occur via personal user devices, events broadcast from the server system 110, etc. In one example, the database 1120 is similar to the database 116 illustrated in FIG. 2 or the database 820 described in FIG. 8.

The system 1100 further includes sensors that track activities and information in a gaming environment (e.g., an area at, or around, a gaming table, including the surface of the gaming table, props or devices used at the table, player positions at the gaming table, players seated at a table, back betters, casino staff, etc.). One example of sensors that track the gaming environment include cameras 1131 and 1132. The cameras 1131 and 1132 (or other sensors) may be those associated with a gaming system according to the disclosure of, for instance, in the aforementioned US Patent Application Publication No 2020/0098223 (Kelly et al.).

The system 1100 also includes output devices, such as projectors 1133 and 1134 (e.g., to project content, such as the message 1127), displays 1137 and 1138 (e.g., to show information about the network game, such as progressive jackpot amounts), a virtual dealer 1125 (e.g., to provide verbal notifications), speakers, personal devices (e.g., personal mobile device 1139), etc.

Several stages of activity are illustrated in FIG. 11. The description of FIG. 11 refers to a "game controller," which (as similarly described in FIG. 10) may be the processor in the server system 110, processor 208 of device controller 202, processor 308 of table controller 304, a processor for server computing device 114, a processor for a sensor inside of a device, a processor for a display, a processor for a personal mobile device or smartphone, any combination of processors, etc. For the purposes of FIG. 11, the game controller may be assumed to be a processor in the server system 110 and which utilizes the processors of other devices in the system 1100 via communication on the network(s).

At stage "A," the game controller selects a winning card in response to detecting a payout proximity trigger for a network progressive game. In some embodiments, as illustrated in FIG. 11, the game controller detects the payout trigger in response to analysis of progressive jackpot game data 1190 (e.g., progressive pool funding data). For example, the game controller detects that funding for a pool for the network progressive game is within a given monetary amount from a payout threshold value. In some embodiments, the game controller detects the funding by monitoring placement of qualifying initial bets at the gaming tables linked to the progressive game. Each of the qualifying bets adds to the pool until the pool reaches the payout threshold value (e.g., the amount of funding for the pool increases according to the contribution values from the initial bets, thus eventually reaching the payout threshold value). In some embodiments, the progressive game is a "mystery" progressive jackpot game (also referred to as a "must-hit-by" progressive jackpot). The value of every mystery jackpot is determined immediately after the preceding jackpot is won by a and stored (as encrypted data) by the game controller. The mystery jackpot is publicly disclosed to be within a certain range (for example, a small jackpot might be programmed to pay out at between $1,000 and $3,000). The jackpot pays on the wager that causes the jackpot to reach or exceed the payout threshold value, with the maximum value within this range being the "must-hit-by" amount. For instance, for a mystery jackpot the game controller selects a random number within a range (e.g., $1,000-$3,000). The randomly selected number is a threshold value for the pool that the game controller selects at the beginning of the game/immediately after awarding the last jackpot. The threshold value is the amount at which the pool of wager contributions triggers the payout for the mystery jackpot. Only the upper value of the range is advertised (e.g., "must hit by or before $3,000") but the actual threshold value (e.g., the value between $1,000-$3,000) is kept secret by the game controller. Over time, the tables connected to progressive jackpot make contributions (e.g., the contributions are a percentage of certain bets made at the table, such as bets that meet a minimum bet amount). The game controller tracks the progressive jackpot pool as the contributions progressively add up and displays the amount of the pool on a jackpot counter (e.g., on displays 1137 or 1138). In some instances, after the threshold value is reached, the game controller can hold the payout amount in escrow for the gaming table from which the contribution was made that went over threshold value. In some instances, the game controller can hold the payout amount in escrow until after a winning card value is selected (from an undealt portion of a deck of cards) and revealed (i.e., dealt). In FIG. 11, the card with the winning card value may be referred to as a "mystery" card (e.g. mystery card 1163 or mystery card 1183).

In some embodiments, the condition for the trigger may involve a specific bet. For example, detecting the trigger may involve detecting that a player account contributes a bet to the progressive jackpot. In yet other examples, the condition for the trigger may involve a bet amount (e.g., a minimum bet value), a game play activity (e.g., a split hand, a certain number of hands per amount of time, etc.), and so forth. For example, detecting the trigger may involve detecting that a minimum bet value was made for eligibility in the progressive jackpot.

Referring still to FIG. 11, at stage "B," the game controller determines, based on analysis of shuffle-state image data of a plurality of shufflers, a card order for each deck of cards. In some examples, the gaming system obtains a set of images of every individual card from the deck of cards at each table. The set of images are captured by one or more sensors of an automated shuffler device (such as shuffler device 1111) as the shuffler device organizes each individual card into a shuffled card order 1160 for the entire deck. The shuffled card order 1160 occurs according to a random number generated by the shuffler device 1111 when the shuffler device 1111 shuffles the cards. The shuffled card order 1160 includes a sequential-position value for each card in the deck. For example, a first card 1105 occupies a first sequential position (i.e., a [$1^{ST}$] position in the shuffled card order 1160) and a last card 1156 occupies a last sequential position (i.e., the [LAST] position). In one example, the game controller can obtain the images by capturing the images directly via one or more sensors inside of an automated shuffler or from retrieving the images from an image store. In some embodiments, the images may be captured in response to detecting the payout proximity trigger. In some embodiments, the payout proximity trigger occurs with enough time before the funding from the pool reaches the payout threshold such that the game controller has time to broadcast an electronic task to all shufflers devices on the network to begin capturing images of the shuffled cards at the eligible gaming tables 1101 and 1102. In some embodiments, the game controller can begin capturing the images from the shuffler devices (811 and 1112) with enough time to collect the order of cards for all decks at all tables (including any shuffled decks used as backups) before beginning a selection process for a winning card value. In some embodiments, the game controller identifies, via a neural network model, a face value of each individual card from each set of images. In response to identifying the face values, the game controller assigns a sequential-position value to the face value for each card in each of the of decks of cards. The sequential-position value matches the sequence order in which the card was placed within the shuffled deck when the shuffler device organized each individual card into the randomized, shuffled card order 1160 during shuffling.

In some embodiments, the images of the shuffled cards may be captured in response to detecting the payout proximity trigger. In some embodiments, the payout proximity trigger occurs with enough time before the funding from the pool reaches the payout threshold such that the game controller has time to broadcast an electronic task to all shufflers on the shuffler network to begin capturing images of the shuffled cards at the eligible gaming tables. In some embodiments, the game controller can begin capturing the images with enough time to collect the order of cards for all decks at all tables (including any shuffled decks used as backups) before selecting the winning card value.

At stage "C," the game controller determines, in response to determining the card order, that a mystery card will be dealt from an undealt subset of one of the deck of cards at one of the gaming tables for a subsequent game play round during which the payout threshold value is reached. In some embodiments, the game controller determines that the mystery card will be dealt based at least on the shuffled card order 1160 and one or more rules associated with each wagering game presented at each of the gaming tables, such as card distribution rules for the wagering game. For example, the game controller determines a sequential-position value of a top card 1162 of an undealt portion of each of the deck of cards at the gaming tables. In some embodiments, in response to detecting the payout proximity trigger (e.g., in response to detecting that the funding for the progressive game pool is near the payout threshold value), then a specific winning card value (or combination of specific cards) may be selected (according to progressive game rules) to track across the multiple shufflers. As mentioned previously, regarding FIG. 11, any card, from the decks, which has the winning card value may be referred to as a “mystery” card (e.g., mystery card 1163 or mystery card 1183) and its appearance during a playing round indicates that at least one player at the gaming table (e.g., a specific player at the gaming table) wins the progressive jackpot. By knowing the top card 1162 of the undealt portion of a deck of cards, then the game controller keeps track of a first subset of the deck of cards that has been dealt (e.g., dealt subset 1105) and a second subset of the deck of cards that has not been dealt yet (e.g., undealt subset 1107). The system can then select the mystery card 1163 (or card combination) from the undealt subset 1107.

The game controller can determine the sequential-position value of the top card 1162 in various ways. For example, the game controller can directly capture the images via one or more sensors inside of an automated shuffler, such as shuffler devices 1111 and 1112. In another example, the game controller can retrieve and analyze a set of images for the shuffle state from an image store (e.g., stored within a memory associated with the shufflers 1111 or 1112, in a memory stored at the respective gaming tables 1101 and 1102, in the database 1120). Further, in some embodiments, the game controller can count a number of cards already dealt and compare the count to the shuffled card order 1160. For example, the game controller can determine a number of cards that have been dealt based on analysis of image data, weight, etc. taken from sensors in the environment around a gaming table, such as image sensors and/or scales positioned at a card discard pile or discard bin for already dealt cards. The discarded cards comprise the dealt subset 1105. The game controller can then access a specific image having a sequential-position value that corresponds to the number of cards already dealt plus one. The specific image of that card represents the card at the top of the undealt portion of the deck of cards according to the card order (e.g., card 1162). In other words, the card 1162 occupies a sequential-order value, from the shuffled card order 1160, which represents the next card to be dealt from the undealt subset 1107 (i.e., the next-to-be-dealt position, or [NTBD]). In other words, the card 1162 is at the top of the undealt portion of the deck of cards at the gaming table 1131.

As mentioned, the game controller can also determine the sequential-position value of the card 1162 from direct analysis of previously captured images. For example, the game controller can determine, based on analysis of an image captured from a sensor in a card shoe (e.g., card shoe 1135), a face value of the last card dealt 1161. The game controller can then access and analyze a set of images of a shuffled order for the deck of cards. The game controller determines a sequence position in the shuffled card order 1160 that corresponds to the face value of the last card dealt (i.e., the [LD] position). The game controller then selects, as the sequential-position value of the top card 1162, the next sequential position in the card order after the [LD] position, which corresponds to the [NTBD] position.

In some embodiments, the game controller can communicate with the shoe 1135. In some instances, the shoe 1135 tracks each face value of each card as it is dispensed and also keeps a running count of the sequential-position value for each card as it is dispensed. The game controller can thus query the shoe 1135 for that information. In some instances, the shoe 1135 also communicates with the shuffler device 1111 and may store information about the dispensed cards in a memory associated with the shuffler device 1111. The shuffler device 1111 can use that information to keep a record of the dealt subset 1105 and the undealt subset 1107 as each card is dispensed. Thus, in some embodiments, the game controller can query the shuffler device 1111 regarding only the undealt subset 1107. For example, if the game controller is on the server system 110, then the server system queries the shuffler device 1111 for a sequential card order of only the undealt subset 1107. In other words, the shuffler device 1111 may track the shuffled card order 1160 and the determination of the last card dealt 1161 to keep track of the undealt subset 1107. The shuffler device 1111 can, after analysis of the images of the cards that were shuffled, provide a summary report indicating the shuffled card order 1160 and a sequential-position value and face value for each card (as opposed to sending the server system 110 image data to analyze, so that the server system 110 does not have analyze each set of images). In other words, in one embodiment, if the shuffler device 1111 performs the image analysis in real time, tracks the shuffled order 1160 and also tracks the undealt subset 1107, then the game controller (e.g., on the server system 110) only needs to know about the undealt subset 1107 and can receive the data it needs to perform analysis of a relative position of the mystery card 1163 within the undealt subset 1107. In some embodiments, the shuffler device 1111 can perform the analysis of the relative positions based on a transmission by the server system 110 for a sequential-position value of the mystery card 1163 directly in relationship to sequential-position value of the card 1162.

In some instances, the game controller can determine when the mystery card 1163 will be dealt based on a minimum number of cards to be dealt for the given playing round. In some instances, the minimum number may be based on an assumption that at least one player is participating in the wagering game at the gaming table 1101. In other embodiments, however, the game controller can more accurately determine the minimum number of cards to be dealt in response to determining a number of participants at the gaming table 1101. In one example, the game controller determines the number of participants based on participant activity captured via one or more sensors in the gaming environment, such as cameras 1131 and 1132. In some embodiments, the game controller determines the participant activity in response to analysis of environmental image data of one or more of placement of a bet or performance of a game-play action at the gaming tables. The US Patent Application Publication No 2020/0098223 (Kelly et al.) describes a system and method for analyzing environmental image data, via one or more neural network models, to determine identities and values related to players, cards, and gaming chips (e.g., identifying values of bets from analysis of images of chip stacks placed on a gaming table). Based on the determined player activity, the game controller determines a number of players that participate (e.g., that place, or have placed, a qualifying bet, or other such minimum initial “progressive funding bet” (initial bet), for an active playing round at the respective tables). In some examples, instead of just a bet alone being the triggering event (e.g., to trigger the funding of the progressive pool that puts it over the threshold), the game controller can detect actual bet amounts to determine whether the contribution amounts will go over the trigger. (e.g., including for side betting and side bet amounts). In some instances, the game controller can require that an additional triggering event be performed as part a game process and/or during game play (e.g., the game controller may require that specific cards appear and also a game participant must have done something in addition to betting for the current round, such as they may need to have split a bet). Furthermore, in addition to determining the number of players, the game controller determines, according to game play rules for each game at each table, a minimum number of cards that each of the number of players should be initially dealt at the beginning of each game play round game. The game controller can query the shuffler devices 1111 and/or 1112 and/or the gaming tables 1101 and/or 1102, for information, such as game settings and game rules, for any game being played (e.g., as described in FIG. 6). The game controller multiplies the number of players by the minimum number of cards to be dealt per player to determine a minimum number of cards to be dealt during the playing round in a subsequent playing round. The game controller then evaluates, based on the number of cards to be dealt, a sequential-position value for the mystery card 1163 against the sequential-position value of the top card 1162 (i.e., game controller evaluates the [MC] sequential-order value against the [NTBD] sequential-order value). For instance, the game controller can count a number of sequential position values (count 1113) from the first sequential-position value (i.e., [NTBD]) to the second sequential-position value (i.e., [MC]). If the minimum number of cards to be dealt during the playing round is more than or equal to the count 1113, then the mystery card 1163 is certain to be dealt in the next upcoming playing round for that particular deck of cards.

In one example, such as in the case of Texas Hold 'Em Poker, or variations thereof, a community hand and a player hand are dealt. For instance, three to five cards are dealt as community cards during a round of play, two hole cards are dealt as a player hand to each participating player, thus a minimum of seven cards would be dealt at a table with two participants (e.g., four hole cards dealt (i.e., two for each participant)+three initial community cards on the flop=seven cards initially dealt). Thus, in the case of two game participants, if the position of the mystery card 1163 is within seven cards of the top card 1162, then the game controller can accurately predict that the mystery card 1163 will appear within one playing round. In another example, in a game of Blackjack, at least 2 cards will be dealt for each participating player (e.g., two cards are initially dealt for each player's hand and 2 cards are dealt for the dealer hand). If more than one player is betting during the round, then an additional 2 cards would be considered to be dealt for each additional player as initial card hands. Thus, for a game of Blackjack with at least one player and the dealer, then at least 4 cards would be dealt during an initial deal of the playing round. For instance, in a scenario where the gaming table 1101 presents a Blackjack game, if the position of the mystery card 1163 is within four cards of the card 1162 of an undealt portion of a deck, then the game controller can accurately predict that the mystery card 1163 will appear within one playing round.

If the minimum number of cards to be dealt is less than the count 1113, then the game controller can track as the cards are being dealt in real time to estimate whether the mystery card 1163 may still possibly be dealt in the current playing round or whether the mystery card 1163 will be dealt in a subsequent playing round. For example, in the case of Texas Hold 'Em, after the flop an additional 2 community cards may be dealt (e.g., if the playing round continues after the flop to the dealing of the "turn" or the "river" cards). In the case of Blackjack, many additional cards beyond an initial deal may be dealt from the deck during the playing round (e.g., additional "hit" cards dealt to the player or to the dealer). Thus, in some instances, the game controller estimates when the mystery card 1163 will be dealt based on a range of possible cards to be dealt. For example, in the case of standard Texas Hold 'Em, a predicted minimum number of dealt cards for any given subsequent playing round is equivalent to the number of players participating times two (for each respective initial hand), plus three cards for the flop (i.e., minimum predicted cards dealt for Texas Hold 'Em round=(number of players)×(two initial cards per player)+(three additional cards for flop)). A predicted upper limit for the range of possible cards dealt may include the computation for the minimum value plus two additional cards for the turn and the river and any additional burned cards (e.g., if a dealer is required to burn cards, then those number of required burned cards are added to the possible upper limit). For Blackjack, a minimum predicted cards dealt includes the number of players participating (including the dealer), times two (for each respective initial hand). An upper limit for the range of possible cards dealt may include a maximum number of cards allowed to be dealt per player. For example, according to some game rules for Blackjack, if a player is dealt 7 cards and still does not bust, then the player may be considered an automatic winner. Thus, the game controller can determine that a minimum number of cards dealt for any given hand may be between two cards (i.e., the minimum required to be dealt) and seven cards (i.e., the maximum required for an automatic win). In other circumstances, such as in a game where there is no rule regarding a maximum amount of cards to be dealt, the game controller may estimate that no given Blackjack hand could be more than 11 cards in total without busting (e.g., four "Aces"+four "Twos"+three "Threes"=eleven cards). Thus, the game controller may utilize a range of cards to be dealt to be between two cards (i.e., the minimum required to be dealt) to eleven cards for any given hand. If the sequential-position value for the mystery card 1163 is within the minimum number of cards required to be dealt, then the game controller can estimate that the card will appear in the current playing round. If the sequential-position value for the mystery card 1163 is beyond the minimum number, yet still within the upper limit, then the game controller can estimate (based on the number of cards to be dealt beyond the minimum) whether that the card will possibly appear in the current playing round, or whether it will appear in a subsequent playing round after the current playing round. If the sequential-order value for the mystery card 1163 is beyond the upper limit, then the game controller estimates (i.e., forecasts) that the mystery card will be dealt in a subsequent playing round (not in the current playing round).

In the case of splitting, the game controller can further detect whether a split would be possible given the card order of the undealt set of cards. For example, splitting may be done when a pair of cards (with matching rank values) is dealt for a player's initial hand. The game controller can analyze the undealt card order and determine whether there are any cards of matching rank value within the undealt portion. Furthermore, the game controller can determine whether it is possible for any of those matching cards to be dealt to the same playing hand. For example, at a table with more than one player, if the cards are dealt at the table consecutively (e.g., if the dealer/card dispenser deals the two initial cards consecutively to each player hand), then the game controller can determine, from the card shuffled-card order 1160 and from the known method of distributing the cards, that two cards of the same rank positioned consecutively next to each other in the order of the undealt subset have a chance of being dealt as a pair that could be split. In another example, if the cards are dealt in a round (e.g., if the dealer deals the first card (of each initial two-card hand) to each player in turn before dealing the second card to each player), then the game controller can determine that a same player could be dealt two cards of the same rank, if the two cards are positioned far enough away from each other in the deck order such that the dealer/card dispensing controller would deal the two cards based on the number of players to whom cards must be dealt. For example, if the dealer dealers the initial cards in a round, and if there are two matching card ranks in the undealt portion (e.g., two "8's"), the game controller uses the number of game participants as a reference value as to whether the round of dealing would land back on the same player. For instance, if there are four participants receiving cards, and if the two 8's are four sequential-position values apart from each other, then the game controller determines that the matching card pair (i.e., both 8's) would be dealt to the same player, thus being eligible for a split. The game controller can, thus, update the upper limit of possible cards to be dealt during the current playing round. The game controller can utilize the same technique of determining whether two of the same card would be dealt to the same person as for determining whether any two cards would be dealt in the same round to the same player. Thus, the system can determine whether not only one mystery card is dealt to the same player, but also whether two or more mystery cards (of any given required face values) would be dealt to the same player.

In some embodiments, the game controller may forecast a number of subsequent rounds before the card will be dealt using a recent history of playing activity. For example, the game controller may determine that a given gaming table has had two players playing at it regularly for a short amount of time (e.g., fifteen minutes). As a result, the game controller may predict that those two players may be at the table, and will continue to make consistent bets for an additional period of time (e.g., an additional 15 minutes), according to historic play patterns of the players, common statistical playing times for players, betting patterns given an initial buy-in, betting patterns given minimum bet values, detected chip amounts at a table, etc. The game controller may further take into consideration a time of day, a time or year, or other possible factors that may cause an increase or decrease to the level of play. Given all of the information available to it, the game controller may determine (e.g., forecast), that a range of cards may be dealt (e.g., between the minimum required to be dealt and the estimated upper limit) for each of the tables given the number of cards left in each undealt portion of the deck. As events occur in real time (e.g., as the game controller detects players leaving or joining tables in real time), the game controller updates the forecast. Forecasting, thus, may become more accurate the closer the mystery card 1163 comes to being dealt (e.g., as the mystery card 1163 rises to the top of the undealt portion of the deck).

The game controller can perform operations related to the mystery card 1163 for the table 1101 concurrently with performing similar operations related to an additional mystery card 1183 for the table 1102. In some examples, the game controller may detect that the mystery card appears at different tables (such as the example shown in FIG. 11, where the mystery card 1163 and the mystery card 1183 of an equivalent face value are both in undealt subsets). In one embodiment, the game controller can split the payout amongst multiple players that were dealt the equivalent mystery card during the same playing rounds. In other embodiment, the game controller may award the payout to the player who first placed a bet during the respective playing rounds. In yet another instance, the game controller may award the payout to the player that placed the bet that caused the pool to reach the payout threshold value. In some embodiments, if the game controller detects that any of the mystery cards have already been dealt out at a table (e.g., if the card is sitting in a discard pile), then the system excludes that table from the prediction as to whether the specific card will be dealt to that table.

In some embodiments, the game controller may require that a mystery card be dealt to a specific player, such as to a player that placed an initial bet that caused the pool to meet the payout threshold value. To do so, the game controller may select multiple cards from the undealt deck as possible cards to deal during the playing round. After all of the initial bets are placed, the game controller can determine which card will be dealt to which player so long as the dealer (or dealer device) deals the cards according to a predictable pattern. Thus, the game controller can select, as the specific card, one of the cards that will be dealt to the player.

At stage "D," a game controller provides an anticipatory indicator in response to determination that the mystery card will be dealt. In some, the game controller can synchronize presentation of the anticipatory indicator to begin before the progressive pool reaches the payout threshold value and to terminate after the payout threshold value is reached and after the reveal of mystery card is dealt from one of the deck of cards. For example, the game controller can transmit a message to the one or more output devices associated with the plurality of gaming tables 1101 and 1102. The message may indicate an approach of the progressive jackpot being close to its threshold payout value. In some embodiments, the message is a "build-up" to the reveal of the mystery card that coincides with the payout for the progressive jackpot. For example, the game controller can present an anticipatory message via a virtual dealer 1125, via a message 1127 projected onto the gaming table 1102 via projector 1134, via a message presented on the displays 1137 or 1138, via a message presented from speakers at the gaming tables 1101 and 1102, via environmental lighting at or surrounding a table, or in any other way. In some embodiments, the game controller transmits one or more anticipatory messages to devices associated with an individual game participant (e.g., augmented reality glasses or headsets, a personal mobile device 1139, etc.). In some embodiments, the game controller detects a mobile device identifier associated with a player account. The game controller can broadcast the anticipatory indicator to the mobile device using the mobile device identifier.

At stage "E," a game controller electronically validates that the mystery card was dealt. For example, the game controller can analyze image data associated with one of the plurality of gaming tables at which the at least one card was dealt. The game controller can detect, via one or more neural network models, which cards are dealt at the gaming tables. For example, the cameras 1131 and/or 1132 capture images of the participants (e.g., players 1141 and 1142) at the gaming tables 1101 and 1102. The game controller can also analyze the images to detect face values of cards that are dealt at the gaming tables 1101 and 1102 to the various participants at various times. The game controller can utilize one or neural network models that have been trained to identify dealt cards and to identify features of the different face card values from the dealt cards. The aforementioned US Patent Application Publication No 2020/0098223 (Kelly et al.) describes some examples of utilizing a trained neural network model to identify card values.

In response to detecting that mystery card was dealt, the game controller can make a notation of a payout to a player and/or to a known player account for the player. The game controller can further make a note of the payout to other accounts and/or entities, such as to a casino accounting department, a casino security group, etc. For example, the game controller can combine all of the details of events into a report of the win showing timestamps, video clips, security video, trigger details, funding data, neural network analysis data, player's activity (e.g., bets made, bet amounts, gestures related to play, etc.) details about the hand that won, details about the dealer's activities, details about the shuffled states of the decks of cards at the tables, card orders of decks during playing rounds, details about cards that are revealed, details about cards discarded (e.g., discard bin weight, discard bin video, etc.), identity of players at the gaming table, jackpot payout data, account linking data, image data (e.g., video of the table, video of the players and dealer, video of back-betters, images of cards dealt, images of cards shuffled, etc.) environmental data, sensor data, game data, table statistics data, dealer statistics data, and/or any other relevant information. The system can store the details as data in one more memory locations (e.g., on the shuffler devices 1111 and 1112, at the gaming tables 1101 and 1102, in player accounts, in casino accounts, in databases, at servers, etc.).

In other embodiments, the gaming controller can set a level of detail to be captured for validation and/or reporting purposes based on a level of a progressive game. For example, the game controller can provide an option for the casino operator to select a level of data to collect and store. For instance, the casino may run multiple tiers or levels of progressive bonus games. Some may be for lower amounts of money (e.g., a first level of progressive game has a progressive pool threshold value within the range of $50-$99 before it must pay out). Others may be for higher amounts of money (e.g., a second level of progressive game may be for $100-$999, a third level may be from $1,000-$9,999, and a fourth may be $10,000+). The levels may be set by a casino operator according to accounting/auditing policies, jurisdictional requirements for tracking, marketing needs, etc. For example, for a lower level progressive, the casino may not want or need to collect and store information about every detail of the progressive win (e.g., may not need to record and store video of the environment, may not need to store time stamp data about every detail, etc.), whereas for higher level progressives the casino can set the option within the system 1100 to store all relevant information including recording and storing the video from environmental cameras of every event as it occurred with time stamps.

Embodiments will vary as to what and where data collection, reporting, and analysis are done. In some embodiments, a gaming device may be fairly simple and relatively inexpensive, and its data collection and reporting capabilities will reflect these limitations. In one embodiment, such a gaming device will do no data analysis at all; it will all be done at a server location (or other computer that eventually receives or has access to the data). At the other end of the spectrum may be multi-functional gaming devices having the ability to perform multiple game functions as well as support multiple games, and further having their own displays, printers, and other components. Such sophisticated gaming devices may do some analysis of the data collected that enables them to generate, locally in a manner readable by humans. This may include output to a printer or on a screen. This enables a casino or other user of the device to track their usage, current amount owed, possible servicing requirements, and other parameters.

It is expected that the most sophisticated data analysis regarding predictive failure analysis will be done centrally, at least in part because more sophisticated analysis uses data from many gaming devices. However, some or all of the results of such analysis may be downloaded to any individual gaming devices that are sophisticated enough to use them, typically in the form of what the gaming device may detect in terms of patterns in its own data. Examples of such patterns may include the occurrence of certain logged events during a specified time period from a component, or, certain data entries, measurements, interrupts, or logs from a set of components that by themselves do not raise an alarm, but do raise an alarm when they occur together, etc. Any and all patterns determined by data analysis are conceptually included herein.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method of controlling a network game, said method comprising:

selecting, by an electronic processor, a winning card value of an undealt playing card for the network game, wherein the network game spans a plurality of gaming tables communicatively coupled to a network, wherein each of the plurality of gaming tables includes a deck of cards used for individual card games separate from the network game, wherein each of the plurality of gaming tables has a shuffler device communicatively coupled to the network, and wherein the shuffler device is configured to shuffle the deck of cards for the individual card games;

detecting, by the processor in response to analyzing, by a machine learning model, of first image data captured at each of the plurality of gaming tables, that a playing card, having the winning card value, is dealt;

determining, by the processor based on analysis of timing data from transceiver signals associated with a given shuffler device that dealt the playing card, a physical location of a closest one of the plurality of gaming tables relative to the given shuffler device;

capturing, by the processor via environmental image sensors in a gaming environment at the physical location of the closest one of the plurality of gaming tables, second image data of any participants at the closest one of the plurality of gaming tables;

determining, by the processor in response to the analyzing the second image data via the machine learning model, a participant to whom the playing card was dealt; and electronically validating, in response to determining the participant, a win for the network game with an electronic account for the participant.

2. The method of claim 1 further comprising:

accessing, by the processor, shuffle data, game rules, and participant data for the individual card games associated with the plurality of gaming tables, wherein the shuffle data is generated via one or more sensors of each shuffler device at the plurality of gaming tables;

determining, by the processor based on analysis of the shuffle data, a card order of an undealt portion for each deck of cards;

predicting, by the processor, a timing for when a card, associated with the network game, will be dealt from one deck of cards at one of the plurality of gaming tables, wherein the predicting is based on the determined card order, the game rules, and the participant data; and coordinating an event for the network game with the timing.

3. The method of claim 2, wherein the determining the card order of the undealt portion of each deck of cards comprises;

analyzing a set of images captured of each individual card from the deck of cards at each of the plurality of gaming tables, wherein the set of images is captured by the one or more sensors when each shuffler device organizes each shuffled card into a randomized sequential order;

identifying, via the machine learning model, a face value of each shuffled card from each of the set of images;

assigning, in response to the identifying, a sequential position value to the face value for each card in the each of the of decks of cards, wherein the sequential position value corresponds to the randomized sequential order; and determining, based on analysis of data obtained via the environmental sensors in the gaming environment, a first sequential position value of a top card of the undealt portion of the deck of cards, wherein the top card and each card that follows in the randomized sequential order after the first sequential position value are the undealt portion.

4. The method of claim 3, wherein the predicting, that the card will be dealt comprises;

counting a number of sequential position values from the first sequential position value to a second sequential position value, in the randomized sequential order, which second sequential position value corresponds to the card;

comparing the number of sequential position values against a minimum number of cards to be dealt during a subsequent game play round; and determining, based on the comparing, that the number of sequential position values is less than or equal to the minimum number of cards to be dealt.

5. The method of claim 4 further comprising:

determining, in response to analysis of the participant data, a number of game participants at one of the plurality of gaming tables;

determining, in response to analysis of the game rules, a minimum number of cards to be dealt per participant according to card distribution rules for a wagering game played at the one of the plurality of gaming tables; and multiplying the minimum number of cards to be dealt per participant by the number of game participants, wherein the minimum number of cards to be dealt during the subsequent game play round is equal to a product of the multiplying.

6. The method of claim 5, wherein analysis of the participant data comprises analysis of environmental image data of one or more of placement of a bet or performance of a game-play action at the one of the plurality of gaming tables.

7. The method of claim 2, wherein the coordinating comprises:

in response to determination that the card will be dealt, providing an anticipatory indicator for presentation via one or more output devices located at the plurality of gaming tables.

8. The method of claim 7, wherein the providing the anticipatory indicator comprises:

synchronizing, by the game controller, presentation of the anticipatory indicator to begin before a contribution pool for the network game reaches a payout threshold value and to terminate after a payout threshold value is reached and after the card is dealt from one of the deck of cards.

9. The method of claim 2 further comprising:

in response to the coordinating, electronically validating that the playing card was dealt.

10. The method of claim 9, wherein the electronically validating comprises:

determining, in response to analysis of the second image data by one or more machine learning models, an identity of the participant to whom the playing card was dealt; and associating the identity of the participant with an electronic account related to one or more of the participant, the closest one of the plurality of gaming tables at which the playing card was dealt, the network game, or the given shuffler device.

11. The method of claim 1 wherein determining the physical location of the closest one of the plurality of gaming tables relative to the given shuffler device comprises:

electronically communicating, via an additional network, a first transceiver signal from the given shuffler device to any of the plurality of the gaming tables within a threshold range;

storing first timestamp data for the first transceiver signal;

receiving, in response to the first transceiver signal, one or more second transceiver signals transmitted by the any of the plurality of the gaming tables within the threshold range;

storing second timestamp data in response to receipt of the one or more second transceiver signals;

computing, based on analysis of the first timestamp data and the second timestamp data relative to a speed of light, a shuffler-device location, of the given shuffler, relative to the closest one of the plurality of gaming tables amongst the any of the plurality of the gaming tables within the threshold range;

assigning, by the processor based on a shuffler-device location, the given shuffler device to a known gaming-table location of the closest one of the plurality of gaming tables;

instructing, by the processor via the network in response to assigning the given shuffler device to the known gaming-table location, the environmental image sensors to capture the second image data, wherein the environmental image sensors are located in the gaming environment at the known gaming-table location, and wherein the second image data includes an image of the participant to whom the playing card was dealt.

12. The method of claim of 1, wherein determining the physical location of the closest one of the plurality of gaming tables relative to the given shuffler device comprises using a time-of-flight characteristic or a time-difference-of-arrival characteristic related to the transceiver signals.

13. The method of claim 1, further comprising capturing the first image data via an internal image sensor of the shuffler device at each of the plurality of gaming tables, and wherein the analyzing the first image data in response to capturing the first image data.

14. A system comprising:

image-sensing devices; and an electronic game controller configured to control a network card game, wherein the plurality of image-sensing devices are communicatively coupled to the electronic game controller via a network, said system configured to store instructions, which, when executed by the electronic game controller, cause the system to perform operations to:

select a winning card value for the network card game;

obtain, via at least some of the plurality of image-sensing devices, first images of cards being dealt from decks of playing cards for a plurality of card games played at a plurality of gaming tables;

detect, via analysis of the first images using a neural-network model, a card value of each card that is dealt at each of the plurality of gaming tables;

determine, via comparison of each card value to the winning card value, that the playing card having the winning card value is dealt from one of the decks at one of the plurality of gaming tables;

determine, based on analysis of timing data from transceiver signals associated with a card-handling device that dealt the playing card, a physical location of a closest one of the plurality of gaining tables that is closest in distance relative to the card-handling device;

capture, via at least a portion of the image-sensing devices in a gaming environment at the physical location of the closest one of the plurality of gaming tables, second images of any participants at the closest one of the plurality of gaming tables;

determine, via analysis of the second images using the neural-network model, a participant to whom the playing card was dealt; and electronically validate, with an electronic account associated with the participant, a win for the network card game in response to determination that the playing card was dealt.

15. The system of claim 14, wherein the instructions that cause the system to perform the operations to electronically validate the win includes instructions, which, when executed by the electronic processor, cause the system to perform operations to:

in response to determination that the playing card is dealt, associate, via an electronic memory, a first identifier value for the win with a second identifier value for one or more the card-handling device that handled the playing card prior to being dealt or a copy of at least a portion of the images of the cards handled by the card-handling device; and associate, via the electronic memory, the first identifier value with a time-stamp of a time at which the win occurred.

16. A system comprising:

a plurality of shuffler devices, wherein each of the plurality of shuffler devices is configured to communicatively couple with a respective one of a plurality of gaming tables connected via a network; and an electronic game controller for a progressive jackpot game, wherein the plurality of shuffler devices are communicatively coupled to the game controller via the network, said electronic game controller configured to perform operations that cause the system to:

detect a payout proximity trigger for the progressive jackpot game, wherein the progressive jackpot game is configured to pay out when a contribution pool reaches a payout threshold value;

analyze, in response to detection of the payout proximity trigger, shuffle-state image data of each of the plurality of shuffler devices;

determine, in response to analysis of the shuffle-state image data, a card order of an undealt portion for each deck of cards shuffled by the plurality of shuffler devices;

determine, based on the card order and based on card distribution rules, that a mystery card will be dealt from one deck of cards shuffled by one of the plurality of shuffler devices for a subsequent game play round of a wagering game during which the payout threshold value is reached;

determine, based on analysis of timing data from transceiver signals associated with the one of the plurality of shuffler devices, a physical location of a closest one of the plurality of gaming tables relative to the one of the plurality of shuffler devices;

capture, via environmental image sensors in a gaming environment at the physical location of the closest one of the plurality of gaming tables, environmental image data of any participants at the closest one of the plurality of gaming tables;

determine, in response to analysis of the environmental image data via a machine learning model, a participant to whom the mystery card was dealt; and electronically validate, in response to determination of the participant, a win for one or more of the wagering game or the progressive jackpot game with an electronic account for the participant.

17. The system of claim 16, wherein the electronic game controller is configured to perform operations that cause the system to detect player activity at the plurality of gaming tables, wherein the plurality of gaming tables are associated with the progressive jackpot game, wherein the determining that the mystery card will be dealt for the subsequent game play round is based at least in part on the player activity; and wherein detection of the player activity is in response to analysis of the environmental image data of one or more of placement of a bet or performance of a game-play action.

18. The system of claim 16, wherein the electronic game controller configured to determine the card order of the undealt portion for each deck of cards is configured to perform operations that cause the system to:

analyze a set of images captured by one or more sensors of each shuffler device when the shuffler device organizes each individual card into a randomized sequential order;

assign, via a neural network model, a sequential position value to each individual card in the each of the of decks of cards according to the randomized sequential order;

determine, based on analysis of images of dealt cards, a top card of an undealt portion of at least one of the deck of cards;

count a number of sequential position values in the sequential order from a top-card sequence position to a mystery-card sequence position in the at least one of the deck of cards;

compare the number of sequential position values against a minimum number of cards to be dealt during the subsequent game play round for a wagering game for which the at least one of the deck of cards is used; and determine, based on the comparison, that the number of sequential position values is less than or equal to the minimum number of cards to be dealt.

19. The system of claim 18, wherein the electronic game controller is configured to perform operations to cause the system to determine the minimum number of cards to be dealt being configured to perform operations to:

determine a number of game participants for the wagering game;

determine a minimum number of cards to be dealt per participant according to card distribution rules for the wagering game; and multiply the minimum number of cards to be dealt per participant by the number of game participants, wherein the minimum number of cards to be dealt during the subsequent game play round is equal to a product of the multiplication.

* * * * *